United States Patent
Aley et al.

(10) Patent No.: US 10,664,657 B2
(45) Date of Patent: May 26, 2020

(54) SYSTEM AND METHOD FOR INPUTTING IMAGES OR LABELS INTO ELECTRONIC DEVICES

(71) Applicant: TOUCHTYPE LIMITED, London (GB)

(72) Inventors: James Aley, London (GB); Gareth Jones, London (GB); Luke Hewitt, London (GB)

(73) Assignee: TOUCHTYPE LIMITED, London (GB)

( * ) Notice: Subject to any disclaimer, the term of this patent is extended or adjusted under 35 U.S.C. 154(b) by 845 days.

(21) Appl. No.: 15/179,833

(22) Filed: Jun. 10, 2016

(65) Prior Publication Data
US 2016/0292148 A1     Oct. 6, 2016

Related U.S. Application Data

(63) Continuation-in-part of application No. 14/758,221, filed on Jun. 26, 2015, and a continuation of
(Continued)

(30) Foreign Application Priority Data

Dec. 27, 2012    (GB) .................................. 1223450.6
Dec. 12, 2013    (GB) .................................. 1322037.1

(51) Int. Cl.
    *G06F 40/274*      (2020.01)
    *G06F 3/0482*      (2013.01)
    (Continued)

(52) U.S. Cl.
CPC .......... *G06F 40/274* (2020.01); *G06F 3/0237* (2013.01); *G06F 3/0482* (2013.01);
(Continued)

(58) Field of Classification Search
CPC ... G06F 17/27–2795; G06F 17/28–289; G06F 16/3329; G06F 16/335;
(Continued)

(56) References Cited

U.S. PATENT DOCUMENTS 7,831,685 B2    11/2010   Dai et al.
7,836,060 B1    11/2010   Rennison
(Continued)

FOREIGN PATENT DOCUMENTS

CN        1658134 A     8/2005
CN        1707409 A    12/2005
(Continued)

OTHER PUBLICATIONS

"Large, Vibrant community"; Lucene; http://lucene.apache.org/; The Apache Software Foundation; © 2011-2016; accessed Jun. 24, 2016; 22 pages.
(Continued)

*Primary Examiner* — Shane D Woolwine
(74) *Attorney, Agent, or Firm* — Schwegman, Lundberg & Woessner, P.A.

(57) ABSTRACT

System and techniques for receiving text input into electronic devices and predicting a relevant image or label. In a first aspect, the system and techniques comprise receiving text input by a user and a prediction function trained on sections of text associated with an image or label. The prediction function is configured to receive the text input by the user, determine the relevance of the text input by the user to the sections of text associated with the image or label, and predict, based on the sections of text associated with the image or label the relevance of the image or label to the text input by the user. The systems and techniques reduce the burden of entering an image or label.

20 Claims, 17 Drawing Sheets

Related U.S. Application Data application No. PCT/GB2014/053688, filed as application No. PCT/GB2013/053433 on Dec. 27, 2013.

(51) Int. Cl.

| | |
|---|---|
| *G06F 3/023* | (2006.01) |
| *G06F 16/2452* | (2019.01) |
| *G06F 16/242* | (2019.01) |
| *G06F 16/335* | (2019.01) |
| *G06F 16/332* | (2019.01) |
| *G06F 3/0481* | (2013.01) |

(52) U.S. Cl.
CPC ........ *G06F 3/04817* (2013.01); *G06F 16/243* (2019.01); *G06F 16/2448* (2019.01); *G06F 16/24522* (2019.01); *G06F 16/335* (2019.01); *G06F 16/3329* (2019.01)

(58) Field of Classification Search
CPC ........... G06F 16/24–248; G06F 3/0237; G06F 3/04817; G06F 3/0482; G06F 16/243; G06F 16/2448; G06F 16/24522; G06F 40/274
USPC .................................. 706/12, 13, 46, 47, 48
See application file for complete search history.

(56) References Cited

U.S. PATENT DOCUMENTS

| | | | |
|---|---|---|---|
| 8,990,235 | B2 | 3/2015 | King et al. |
| 2008/0244446 | A1 | 10/2008 | Lefevre et al. |
| 2008/0294982 | A1* | 11/2008 | Leung .................. G06F 17/276 715/261 |
| 2009/0083023 | A1* | 3/2009 | Foster ................. G06F 17/2827 704/3 |
| 2010/0125568 | A1* | 5/2010 | van Zwol ............ G06F 16/583 707/722 |
| 2010/0217648 | A1 | 8/2010 | Agarwal et al. |
| 2011/0246457 | A1 | 10/2011 | Dong et al. |
| 2013/0159919 | A1* | 6/2013 | Leydon ................. G06F 3/0236 715/780 |
| 2013/0332162 | A1* | 12/2013 | Keen ....................... G10L 15/26 704/235 |
| 2015/0347920 | A1 | 12/2015 | Medlock et al. |

FOREIGN PATENT DOCUMENTS

| | | |
|---|---|---|
| CN | 101354714 A | 1/2009 |
| CN | 101589425 A | 11/2009 |
| CN | 102326144 A | 1/2012 |
| CN | 102439542 A | 5/2012 |
| CN | 102640089 A | 8/2012 |
| CN | 102737042 A | 10/2012 |
| WO | WO 2010/112841 A1 | 10/2010 |
| WO | WO 2011/042710 A1 | 4/2011 |
| WO | WO 2013/107998 A1 | 7/2013 |

OTHER PUBLICATIONS

"Nearest neighbor search"; Wikipedia; https://en.wikipedia.org/wiki.Nearest_neighbor_search#k-nearest-neighbor; Jun. 2016; accessed Jun. 24, 2016; 7 pages.
"First Office Action and Search Report Issued in Chinese Patent Application No. 201480067660.X", dated Dec. 12, 2017, 24 Pages.
"International Search Report & Written Opinion Issued in PCT Application No. PCT/GB2014/053688", dated Feb. 23, 2015, 10 Pages.
"Office Action Issued in European Patent Application No. 13821126.3", dated Oct. 5, 2018, 6 Pages.
"Non Final Office Action Issued in U.S. Appl. No. 14/758,221", dated Aug. 7, 2018, 21 Pages.
"First Office Action and Search Report issued in Chinese Patent Application No. 201380068827.X", dated Jan. 8, 2018, 12 Pages.
"Second Office Action Issued in Chinese Patent Application No. 201380068827.X", dated Sep. 3, 2018, 10 Pages.
"Second Office Action Issued in Chinese Patent Application No. 201480067660.X", dated Sep. 5, 2018, 17 Pages.
PCT/GB2013/053433, "International Search Report and Written Opinion Issued in PCT Application No. PCT/GB2013/053433", dated Aug. 13, 2014, 8 Pages.
"Oral Hearing Issued in European Patent Application No. 13821126.3", dated Feb. 25, 2019, 7 Pages.
"Third Office Action and Search Report Issued in Chinese Patent Application No. 201380068827.X", (w/ English Translation), dated Mar. 20, 2019, 20 Pages.
"Final Office Action Issued in U.S. Appl. No. 14/758,221", dated Mar. 22, 2019, 19 Pages.
"Non Final Office Action issued in U.S. Appl. No. 14/758,221", dated Jul. 30, 2019, 20 Pages.
"Third Office Action Issued in Chinese Patent Application No. 201480067660.X", (w/ English Translation), dated May 7, 2019, 44 Pages.
"Office Action Issued in European Patent Application No. 13821126.3", dated Oct. 14, 2019, 11 Pages.
"Fourth Office Action Issued in Chinese Patent Application No. 201380068827.X", dated Nov. 8, 2019, (w/ English Translation), 19 Pages.

\* cited by examiner

SYSTEM AND METHOD FOR INPUTTING IMAGES OR LABELS INTO ELECTRONIC DEVICES

CROSS-REFERENCE TO RELATED APPLICATIONS

This application is a continuation of International Application No. PCT/GB2014/053688, filed on Dec. 12, 2014, which claims priority to Great Britain Patent Application No. 1322037.1, filed on Dec. 12, 2013, the disclosures of which are incorporated herein by reference in their entireties.

This application is also a continuation-in-part of U.S. patent application Ser. No. 14/758,221, filed on Jun. 26, 2015, which is a U.S. National Stage Entry of International Application No. PCT/GB2013/053433, filed on Dec. 27, 2013, which claims priority to Great Britain Patent Application No. 1223450.6, filed on Dec. 27, 2012, the disclosures of which are incorporated herein by reference in their entireties.

FIELD OF THE INVENTION

The present invention relates to a system and method for inputting images/labels into an electronic device. In particular, the invention relates to a system and method for offering an image/label to be input into a device on the basis of user entered text.

BACKGROUND OF THE INVENTION

In the texting and messaging environment, it has become popular for users to include images in word-based text. For example, it is common for users to enter text-based representations of images, known as emoticons, to express emotion such as :-) or ;-p [typical in the west] or (^_^) [typical in Asia]. More recently, small character sized images, called emojis have become popular. Stickers have also become popular. A sticker is a detailed illustration of a character that represents an emotion or action that is a mix of cartoons and emojis.

As of October 2010, the Unicode (6.0) standard allocates 722 codepoints as descriptions of emojis (examples include U+1F60D: Smiling face with heart shaped eyes and U+1F692: Fire engine). It is typical for messaging services (eg. Facebook, Whatsapp) to design their own set of images, which they use to render each of these unicode characters so that they may be sent and received. Additionally, both Android (4.1+) and iOS (5+) provide representations of these characters natively as part of the default font.

Although it is popular to input emojis, it remains difficult to do so, because the user has to discover appropriate emojis and, even knowing the appropriate emoji, has to navigate through a great number of possible emojis to find the one they want to input.

Keyboards and messaging clients have tried to reduce the problem by including an emoji selection panel, in which emojis are organised into several categories which can be scrolled through. Although the emojis have been grouped into relevant categories, the user is still required to search through the emojis of that category in order to find the emoji they want to use. Furthermore, some emojis may not be easily classified, making it more difficult for the user to decide in which category they should search for that emoji.

There are known solutions which attempt to reduce further the burden of inputting emojis. For example, several messaging clients will replace automatically certain shorthand text with images. For example, Facebook Messenger will convert the emoticon :-) to a picture of a smiling face and will convert the short hand text sequence, (y), to a picture of a thumbs up when the message is sent.

Additionally, the Google Android Jellybean keyboard will offer an emoji candidate when the user types, exactly, a word corresponding to a description of that emoji, e.g. if 'snowflake' is typed, the picture ❄ is offered to the user as candidate input.

These known solutions to reduce the burden of emoji input still require a user to provide the shorthand text that identifies the emoji or to type the exact description of the emoji. Although the known systems obviate the requirement to scroll through screens of emojis, they still require the user to explicitly and correctly identify the emoji they wish to enter.

It is an object of the present invention to address the above-mentioned problem and reduce the burden of image (e.g. emoji, emoticon or sticker) and label input in the messaging/texting environment.

SUMMARY OF THE INVENTION

The present invention provides systems in accordance with independent claims 1 and 2, methods in accordance with independent claims 32, 33, 34, 54 and 55, and a computer program in accordance with independent claim 56.

Optional features of the invention are the subject of dependent claims.

BRIEF DESCRIPTION OF THE DRAWINGS

The present invention will now be described in detail with reference to the accompanying drawings, in which.

DETAILED DESCRIPTION OF THE INVENTION

The system of the present invention is configured to generate an image/label prediction relevant for user inputted text. In general, the system of the invention comprises a prediction means trained on sections of the text associated with an image/label. The prediction means is configured to receive the text input by a user and predict the relevance of the image/label to the user inputted text.

The image prediction may relate to any kind of image, including a photo, logo, drawing, icon, emoji or emoticon, sticker, or any other image which may be associated with a section of text. In a preferred embodiment of the present invention, the image is an emoji.

The label prediction may relate to any label associated with a body of text, where that label is used to identify or categorise the body of text. The label could therefore refer to the author of the text, a company/person generating sections of text, or any other relevant label. In a preferred embodiment of the present invention, the label is a hashtag, for example as used in Twitter feeds.

The present invention provides three alternative ways of generating image/label predictions to solve the problem of reducing the burden of image/label entry into electronic devices. In particular, the solutions comprise using a language model to generate image/label predictions, using a search engine to generate image/label predictions from a plurality of statistical models, and using a classifier to generate image/label predictions. The alternative solutions (i.e. alternative prediction means) will be described in that order.

Figure 1A:
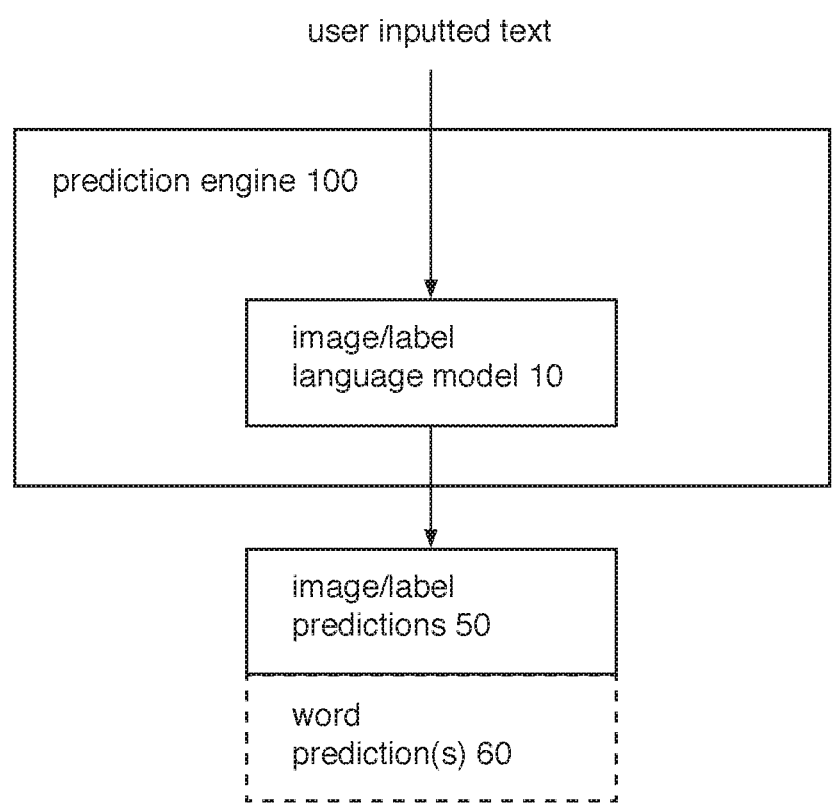
FIGS. 1a and 1b show systems for generating image/label predictions in accordance with a first system type of the present invention.
Figure 1B:
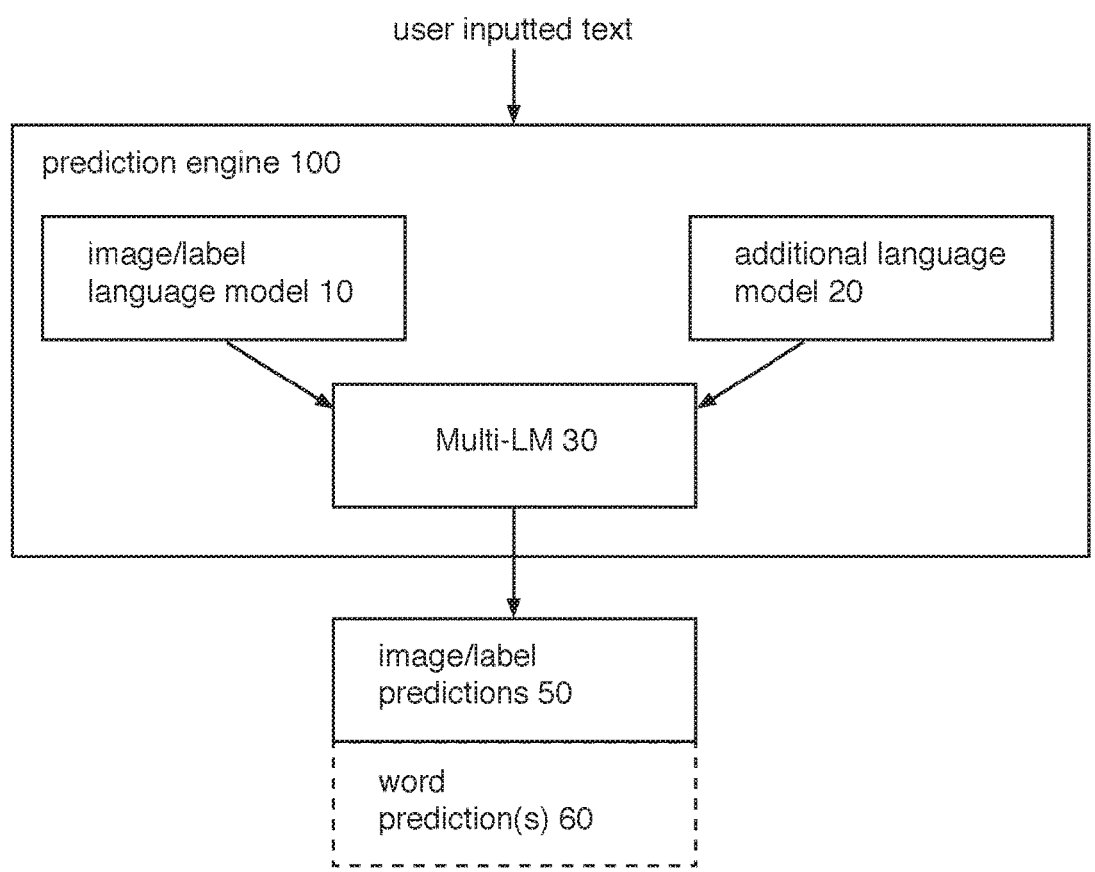

A system in accordance with the first solution can be implemented as shown in FIGS. 1a and 1b, which show block diagrams of the high level text prediction architecture according to the invention. The system comprises a prediction engine 100 configured to generate an image/label prediction 50 relevant for user inputted text.

In FIG. 1a, the prediction engine 100 comprises an image/label language model 10 to generate image/label predictions 50 and, optionally, word prediction(s) 60. The image/label language model 10 may be a generic image/label language model, for example a language model based on the English language, or may be an application-specific image/label language model, e.g. a language model trained on SMS messages or email messages, or any other suitable type of language model. The prediction engine 100 may comprise any number of additional language models, which may be text-only language models or an image/label language model in accordance with the present invention, as illustrated in FIG. 1b.

As shown in FIG. 1b, if the prediction engine 100 comprises one or more additional language models, such as additional language model 20, the predication engine 100 may comprise a multi-language model 30 (Multi-LM) to combine the image/label predictions and/or word predictions, sourced from each of the language models 10, 20 to generate final image/label predictions 50 and/or final word predictions 60 that may be provided to a user interface for display and user selection. The final image/label predictions 50 are preferably a set (i.e. a specified number) of the overall most probable predictions. The system may present to the user only the most likely image/label prediction 50.

The use of a Multi-LM 30 to combine word predictions sourced from a plurality of language models is described on line 1 of page 11 to line 2 of page 12 of WO 2010/112841, which is hereby incorporated by reference.

If the additional language model 20 is a standard word-based language model, for example as described in detail in WO 2010/112842, and in particular as shown in relation to FIG. 2a-d of WO 2010/112842, the standard word-based language model can be used alongside the image/label-based language model 10, such that the prediction engine 100 generates an image/label prediction 50 from the image/label language model 10 and a word prediction 60 from the word-based language model 20. If preferred, the image/word based language model 10 may also generate word predictions (as described below with respect to FIG. 2a-2c) which are used by the Multi-LM 30 to generate a final set of word predictions 60. Since the additional language model 20 of this embodiment can predict words only, the Multi-LM 30 is not needed to output final image/label predictions 50. The word-based language model 20 may be replaced by any suitable language model for generating word predictions, which may include language models based on morphemes or word-segments, as discussed in detail in UK patent application no. 1321927.4, which is hereby incorporated by reference in its entirety.

If the additional language model 20 is an additional image/label language model, then the Multi-LM 30 can be used to generate final image/label predictions 50 from image/label predictions sourced from both language models 10, 20.

The Multi-LM 30 may also be used to tokenise user inputted text, as described on the first paragraph of page 21 of WO 2010/112842, and as described in more detail below, in relation to the language model embodiments of the present invention.

An image/label language model 10 will be described with reference to FIG. 2a-2c which illustrate schematics of image/label language models which receive user inputted text and return image/label predictions 50 (and optionally word/term predictions 60).

There are two possible inputs into a given language model, a current term input 11 and a context input 12. The language model may use either or both of the possible inputs. The current term input 11 comprises information the system has about the term the system is trying to predict, e.g. the word the user is attempting to enter (e.g. if the user has entered "I am working on ge", the current term input 11 is 'ge' This could be a sequence of multi-character keystrokes, individual character keystrokes, the characters determined from a continuous touch gesture across a touchscreen keypad, or a mixture of input forms. The context input 12 comprises the sequence of terms entered so far by the user, directly preceding the current term (e.g. "I am working"), and this sequence is split into 'tokens' by the Multi-LM 30 or a separate tokeniser (not shown). If the system is generating a prediction for the nth term, the context input 12 will contain the preceding n−1 terms that have been selected and input into the system by the user. The n−1 terms of context may comprise a single word, a sequence of words, or no words if the current word input relates to a word beginning a sentence.

A language model may comprise an input model (which takes the current term input 11 as input) and a context model (which takes the context input 12 as input).

Figure 2A:
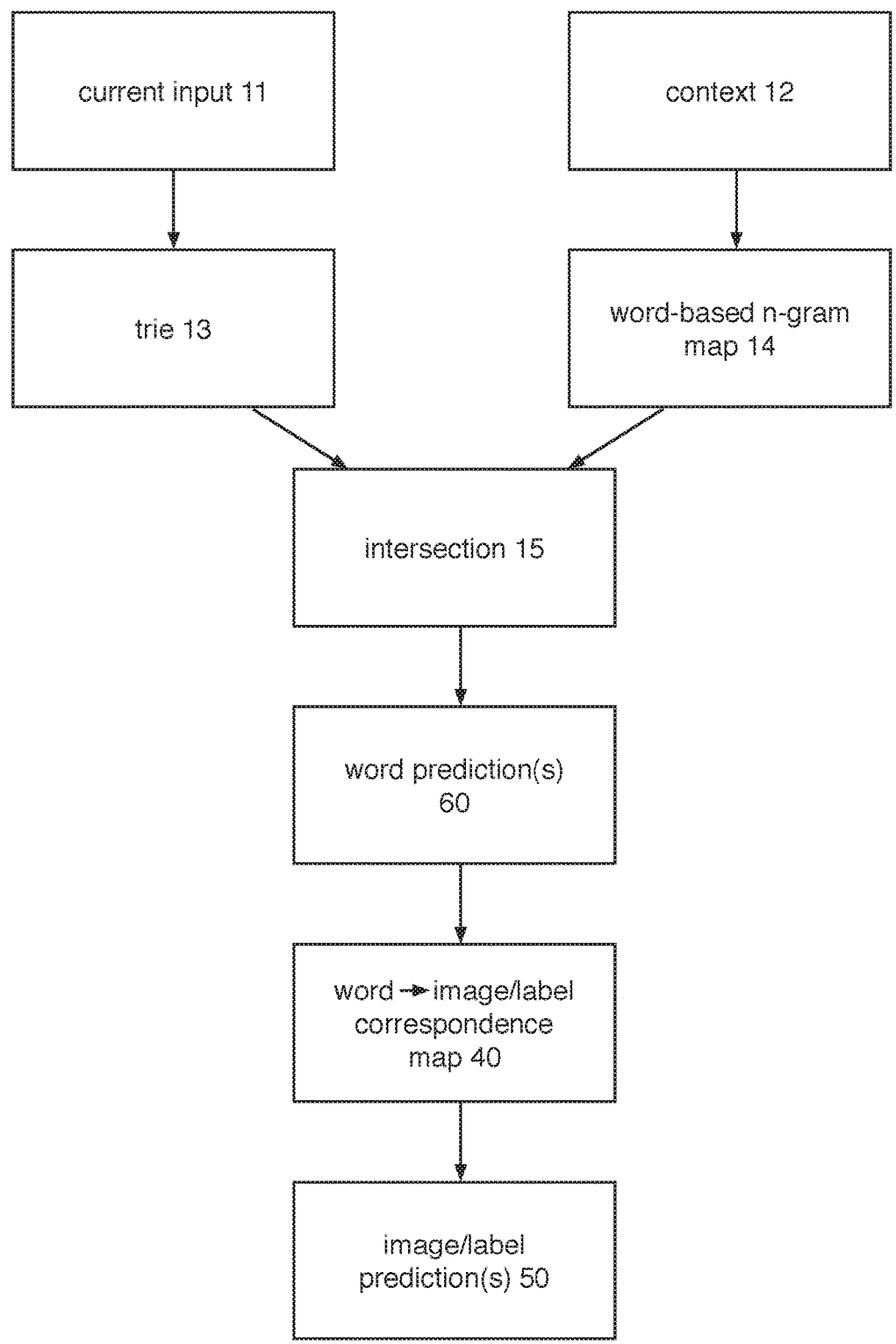
FIGS. 2a-2c are schematics of alternative image/label language models according to the invention, to be used in the systems of FIGS. 1a and 1b.

In a first embodiment illustrated in FIG. 2a, the language model comprises a trie 13 (an example of an input model) and a word-based n-gram map 14 (an example of a context model) to generate word predictions from current input 11 and context 12 respectively. The first part of this language model corresponds to that discussed in detail in WO 2010/112841, and in particular as described in relation to FIG. 2a-2d WO 2010/112841. The language model of FIG. 2a of the present invention can also include an intersection 15 to compute a final set of word predictions 60 from the predictions generated by the trie 13 and n-gram map 14. As described in detail on line 4 of page 16 to line 14 of page 17 of WO 2010/112841, the trie 13 can be a standard trie (see FIG. 3 of WO 2010/112841) or an approximate trie (see FIG. 4a of WO 2010/112841) which is queried with the direct current word-segment input 11. Alternatively, the trie 13 can be a probabilistic trie which is queried with a KeyPressVector generated from the current input, as described in detail on line 16 of page 17 to line 16 of page 20 (and illustrated in FIGS. 4b and 4c) of WO 2010/112841, which is hereby incorporated by reference. The language model can also comprise any number of filters to generate the final set of word predictions 60, as described in that earlier application.

Figure 2B:
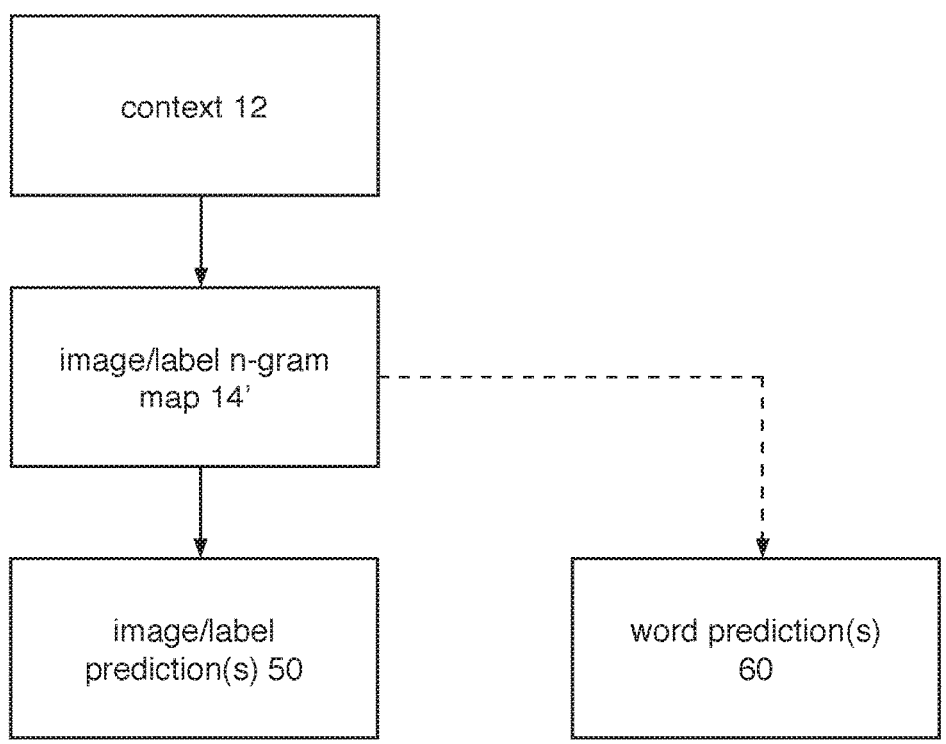
Figure 2C:
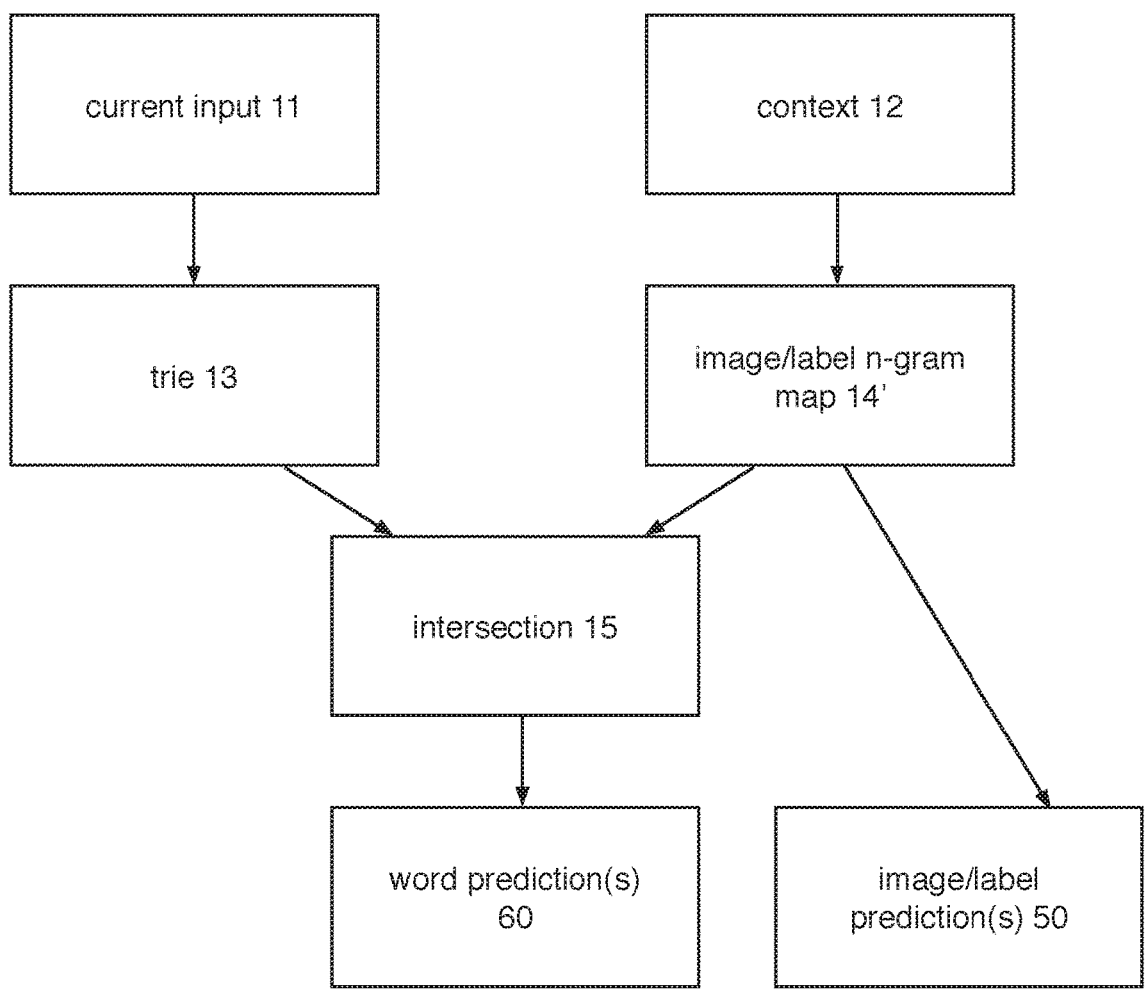

If desired, the intersection 15 of the language model 10 of FIGS. 2a and 2c can be configured to employ a back-off approach if a candidate predicted by the trie has not been predicted by the n-gram map also (rather than retaining only candidates generated by both, which is described in WO 2010/112841). Each time the system has to back-off on the context searched for, the intersection mechanism 15 map apply a 'back-off' penalty to the probability (which may be a fixed penalty, e.g. by multiplying by a fixed value). In this embodiment, the context model (e.g. the n-gram map) may comprise unigram probabilities with the back-off penalties applied.

The language model of FIG. 2a includes a word→image/label correspondence map 40, which maps each word of the language model 10 to one or more relevant images/labels, e.g. if the word prediction 60 is 'pizza', the language model outputs an image of a pizza (e.g. the pizza emoji) as the image prediction 50.

FIG. 2b illustrates a second image/label language model 10 in accordance with the first solution of the present invention. The image/label language model 10 is configured to generate an image/label prediction 50 and, optionally a word prediction 60 on the basis of context 12 alone.

In this embodiment, the image/label language model receives the context input 12 only, which comprises one or more words which are used to search the n-gram map 14'. The n-gram map 14' of FIG. 2b is trained in a different way to that of FIG. 2a, enabling the image/label language model 10 to generate relevant image/label predictions 50 without the use of a word→image/label correspondence map 40. If there is no context 12, then the language model 10 may output the most likely image/label 50 associated with the most likely word 60 used to start a sentence. For certain circumstances, it may be appropriate to predict an image/label on the basis of context only, e.g. the prediction of emojis. In other circumstances, e.g. the prediction of a label (such as a hashtag), it might be more appropriate to use current word input (by itself or in addition to context input), because the user might partially type the label before it is predicted.

Figure 3:
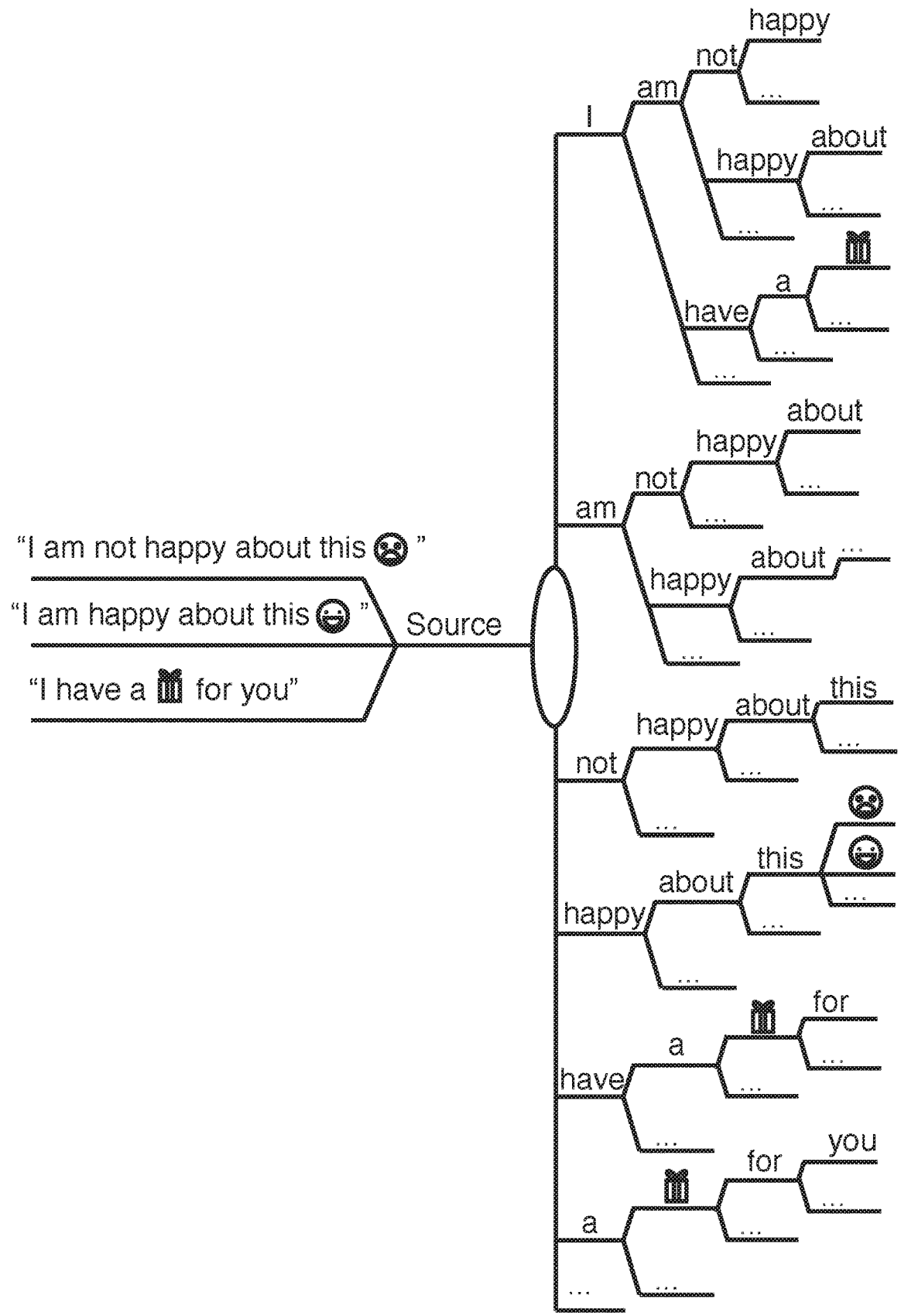
FIG. 3 is a schematic of an n-gram map comprises text sections associated with images/labels (for this example, emojis), for use in the language model of FIGS. 2b and 2c.
Figure 4:
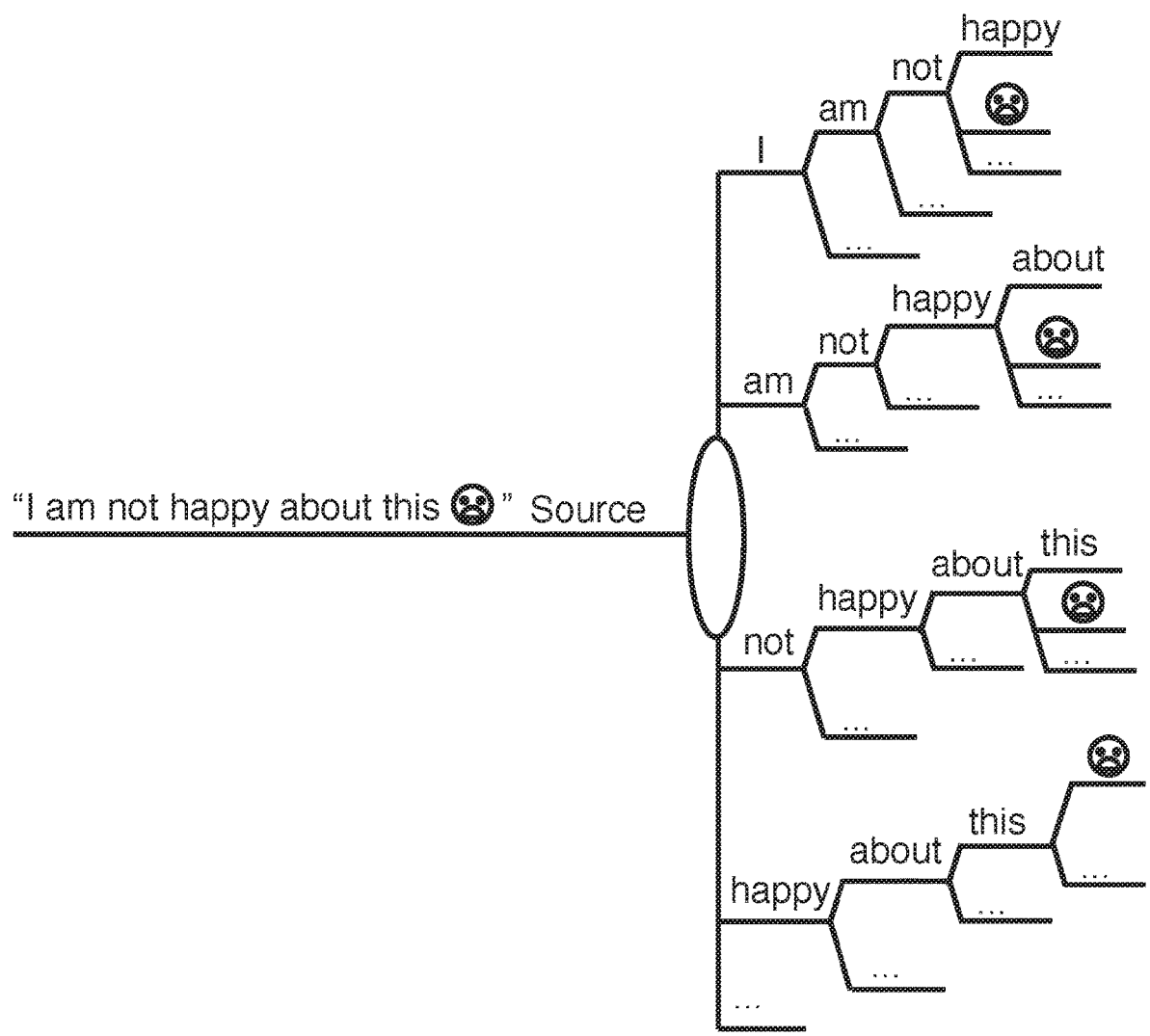
FIG. 4 is a schematic of an n-gram map comprising text sections associated with images/labels (for this example, emojis), where images/labels identified in the training text have been associated with sections of text which do not immediately precede the identified image/label, for use in the image/label language model of FIGS. 2b and 2c.

Examples of n-gram maps 14' of the second embodiment are illustrated schematically in FIGS. 3 and 4, where for illustrative purposes an emoji has been chosen for the image/label.

The n-gram map 14' of FIG. 3 has been trained on source data comprising images/labels embedded in sections of text. For example, the language model could be trained on data from twitter, where the tweets have been filtered to collect tweets comprising emojis. In the n-gram map 14' of FIG. 3, the emojis (which are used merely as an example for the image/label) are treated like words to generate the language model, i.e. the n-gram context map comprises emojis in the context in which they have been identified. For example, if the source data comprises the sentence "I am not happy about this ☹", the emoji ☹ will only follow its preceding context, e.g. if the n-gram has a depth of four "happy about this ☹". The language model will therefore predict the emoji ☹ if the context 12 fed into the language model comprises "happy about this", as it is the next part of the sequence. The n-gram map comprises the probabilities associates with sequences of words and emojis, where emojis and words are treated indiscriminately for assigning probabilities. The probabilities can therefore be assigned on the basis of frequency of appearance in the training data given a particular context in that training data.

The n-gram map of FIG. 4 has been trained by associating images/labels identified within the source text with sections of text which do not immediately precede the identified images/labels. By training the language model in this fashion, the language model is able to predict relevant/appropriate images/labels, even though the user has not entered text which describes the relevant image/label and has not entered text which would usually immediately precede the image/label, such as 'I am' for 'I am ☺'. To train this language model 10, images/labels are identified within a source text (e.g. filtered twitter tweets) and each identified image/label is associated with sections of text within that source text. Using the example of tweets, an emoji of a particular tweet is associated with all n-grams from that tweet. For example: training on the tweet "I'm not happy about this ☹" would generate the following n-grams with associated emoji:

I'm not happy ☹
not happy about ☹
happy about this ☹
I'm not ☹
not happy ☹
etc.

One way to generate emoji predictions from such a non-direct context n-gram map 14' is to take the emojis that are appended to the word sequences of the n-gram map 14' which most closely match the word sequence of the user inputted text. If the user inputted text is $W_1W_2W_3W_4$, the predicted emoji is the emoji that is appended to the sequence $W_1W_2W_3W_4$. An alternative way to generate emoji predictions from a non-direct context n-gram map 14' is to predict an emoji for each word of the user inputted text, e.g. if the word sequence of user inputted text is $W_1W_2W_3W_4$, etc., predict a first emoji, $e_1$, for $W_1$, a second emoji $e_2$ for $W_1W_2$ (where $W_1W_2$ means predicting an emoji for the word sequence $W_1W_2$), $e_3$ for $W_1W_2W_3$ and $e_4$ for $W_1W_2W_3W_4$, etc. The weighted average of the set of emoji predictions ($e_1$, $e_2$, $e_3$, $e_4$) can be used to generate the emoji predictions 50, i.e. the most frequently predicted emoji will be outputted as the most likely emoji. By taking a weighted average of the set of emoji predictions, it may be possible to increase the contextual reach of the emoji prediction.

Owing to the number of different sections of text that can be associated with each emoji, the model is preferably pruned in two ways. The first is to prune based on frequency of occurrence, e.g. prune n-grams with frequency counts of less than a fixed number of occurrences (e.g. if a particular n-gram and associated emoji is seen less than 10 times in the training data, remove that n-gram and associated emoji).

The second way of pruning is to prune on the basis of the probability difference from the unigram probabilities. As an example, after the context "about this", the probability of predicting ☹ will not be much larger than the unigram probability of ☹, because training will also have encountered many other n-grams of the form about this [EMOJI] with no particular bias. The n-gram "about this ☹" can therefore be pruned. A combination of the two pruning methods is also possible, as are any other suitable pruning methods.

Referring to FIG. 2b, the language model 10 receives a sequence of one or more words (context 12) from the Multi-LM 30 and compares the sequence of one or more words to a sequence of words stored in the n-gram map 14'. In relation to the n-gram map of FIG. 3, an emoji is only predicted if the emoji directly follows the sequence of one or more words, e.g. from the context sequence "not happy about this", the language model would predict "CD". In relation to the n-gram map of FIG. 4, the language model generates an emoji prediction much more regularly, as the language model has been trained on direct and non-direct context.

As shown in FIG. 2b, the language model can optionally output one or more word prediction 60 alongside the image/label prediction(s) 50. The language model compares the input sequence of one or more words (context 12) to the stored sequences of words (with appended emojis). If it identifies a stored sequence of words that comprises the sequence of one or more words, it outputs the next word in the stored sequence that follows the sequence of one or more words, for direct input of the next word into the system or for display of the next word 60 on a user interface for user selection, for example.

A third embodiment of a language model 10 is illustrated in FIG. 2c. As with the language model of FIG. 2a, the language model 10 of FIG. 2c comprises a trie 13 and an n-gram map 14' to generate word predictions from current input 11 and context input 12 respectively, and an intersection 15 to generate one or more final word prediction(s) 60. The n-gram map 14' of the third embodiment is the same of that of the second embodiment, i.e. it comprises images/labels embedded within sections of text or appended to sections of text. The same n-gram map 14' can therefore be used to generate image/label predictions 50, as well as word predictions 60.

As will be understood from above, the system of the first solution predicts an image/label on the basis of the user entered text and, optionally, a word/term on the basis of that user entered text.

Although the image/label language models 10 of the first solution have been described in relation to language models comprising trained n-gram maps, this is by way of example only, and any other suitably trained language model can be used.

The second solution to reducing the burden of image/label input, relates to a search engine configured to generate image/label predictions for user input, similar to that discussed in detail in UK patent application 1223450.6, which is hereby incorporated by reference in its entirety.

Figure 5:
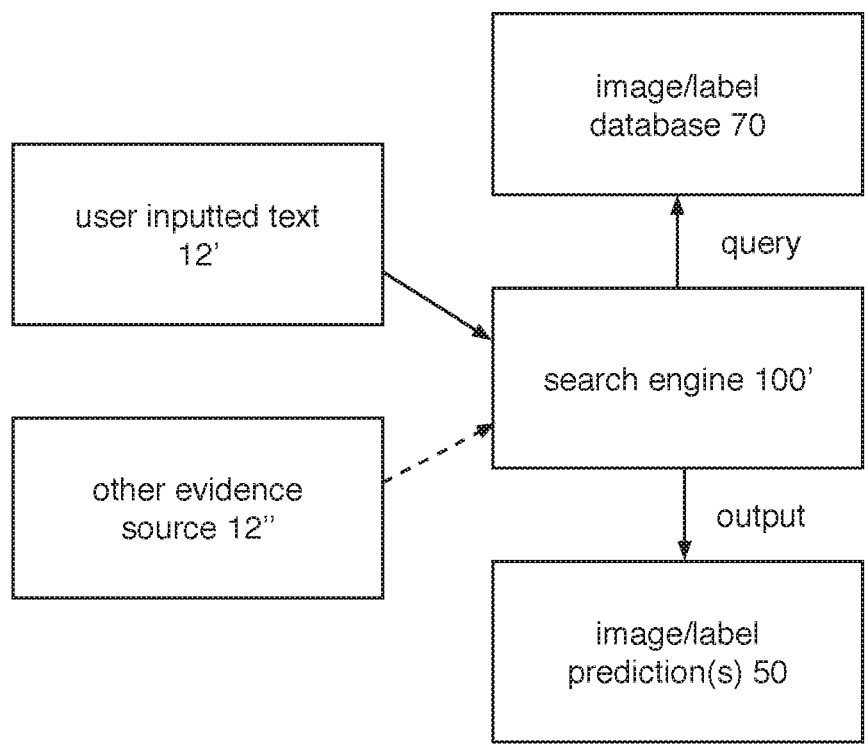
FIG. 5 shows a system for generating image/label predictions in accordance with a second system type of the present invention.

FIG. 5 shows a block diagram of the high level system architecture of the system of the invention. The search engine 100' uses an image/label database 70 that preferably comprises a one-to-one mapping of statistical models to image/labels, i.e. the image/label database comprises a statistical model associated with each image/label (e.g. emoji or hashtag), each image/label statistical model being trained on sections of text associated with that image/label. A language model is a non-limiting example of a statistical model, where the language model is a probability distribution representing the statistical probability of sequences of words occurring within a natural language. Unlike the language model 10 of the first solution, a language model in accordance with this solution does not have images/labels within the language model, it is a text only language model mapped to a particular image/label.

To generate the image/label predictions(s) 50, the search engine 100' uses the image/label database 70 and user inputted text 12' and, optionally, one or more other evidence sources 12", e.g. the image/label input history for a given user of a system. To trigger a search, the search engine receives user entered text 12'.

The image/label database 70 associates individual images/labels with an equal number of statistical models and, optionally, alternative statistical models (not shown) that are not language based (e.g. a model that estimates user relevance given prior input of a particular image/label), as will be described later.

The search engine 100' is configured to query the image/label database 70 with the user inputted text evidence 12' in order to generate for each image/label in the content database an estimate of the likelihood that the image/label is relevant given the user inputted text. The search engine outputs the most probable or the p most probable images/labels as image/label predictions 50, which may optionally be presented to a user.

An estimate for the probability, P, of observing the user inputted text, e, given an image/label, c, is relevant under an associated image/label statistical model M is:

$$P(e|c,M)$$

There are many techniques which could be applied by the search engine to compute the required estimate, such as:
naive Bayesian modelling
maximum entropy modelling
statistical language modelling The first two approaches are based on extracting a set of features and training a generative model (which in this case equates to extracting features from a text associated with an image/label and training an image/label statistical model on those features), while statistical language modelling attempts to model a sequential distribution over the terms in the user inputted text. To provide a working example, the first approach is discussed, but they are all applicable.

A set of features is extracted from user inputted text, preferably by using any suitable feature extraction mechanism which is part of the search engine 100'. To generate a relevance estimate, these features are assumed to have been independently generated by an associated image/label statistical model.

An estimate of the probability of a given feature being relevant to particular image/label is stored in the image/label statistical model. In particular, an image/label statistical model is trained on text associated with an image/label by extracting features from the text associated with the image/label and analysing the frequency of these features in that text.

There are various methods used in the art for the generation of these features from text. For example:
 'Bag-of-words' term presence/absence: The features are the set of unique words used in the text.
 Unigram: The features are simply the words of the text. This model results in words which appear multiple times being given proportionally greater weight.
 Term combination: Features may include combinations of terms, either contiguous n-grams or representing non-local sentential relations.
 Syntactic: Features may include syntactic information such as part-of-speech tags, or higher level parse tree elements.
 Latent topics/clusters: Features may be sets/clusters of terms that may represent underlying "topics" or themes within the text.

The preferred features are typically individual terms or short phrases (n-grams). Individual term features are extracted from a text sequence by tokenising the sequence into terms (where a term denotes both words and additional orthographic items such as morphemes and/or punctuation) and discarding unwanted terms (e.g. terms that have no semantic value such as 'stopwords'). In some cases, features may also be case-normalised, i.e. converted to lower-case. N-gram features are generated by concatenating adjacent terms into atomic entities. For example, given the text sequence "Dear special friends", the individual term features would be: "Dear", "special" and "friends", while the bigram (2-gram) features would be "Dear_special" and "special_friends".

It is preferable for the feature generation mechanism of the search engine 100' to weight features extracted from the user inputted text 12 in order to exaggerate the importance of those which are known to have a greater chance a priori of carrying useful information. For instance, for term features, this is normally done using some kind of heuristic technique which encapsulates the scarcity of the words in common English (such as the term frequency-inverse document frequency, TFiDF), since unusual words are more likely to be indicative of the relevant image/label statistical models than common words. TFiDF is defined as:

$$TF-IDF(t) = \frac{tf(t)}{df(t)}$$

where tf(t) is the number of times term t occurs in the user inputted text, and df(t) is the number of image/label statistical models in which t occurs across all image/label statistical models.

The D features of the user inputted text 12' can be represented by a real valued D-dimensional vector. Normalization can then be achieved by the search engine 100' by converting each of the vectors to unit length. It may be preferable to normalise the feature vector because a detrimental consequence of the independence assumption on features is that user inputted text samples of different length are described by a different number of events, which can lead to spurious discrepancies in the range of values returned by different system queries.

The probability, P(e|c,M), of observing the user inputted text, e, given an image/label, c, is relevant under an associated image/label statistical model M is computed as a product over independent features, j %, extracted from the text input by a user, e:

$$P(e \mid c, M) = \prod_i P(f_i \mid c, M)$$

The search engine 100' is configured to query the image/label database 70 with each feature $f_i$. The database returns a list of all the image/label statistical models comprising that feature and the probability estimate associated with that feature for each image/label statistical model. The probability, P(e|c,M), of observing the user inputted text, e, given an image/label, c, is relevant under an image/label statistical model, M, is computed as a product of the probability estimates for all of the features $f_i$ of the user inputted evidence e, over all of the image/label statistical models M that comprise those features h.

This expression is rewritten, taking g, to be each unique feature which has occurred a given number of times ($n_i$) (where $f_i$=$g_i n_i$) in the user inputted text e, 12':

$$P(e \mid c, M) = \prod_i P(g_i \mid c, M)^{n_i}$$

Assuming the search engine 100' includes the TFiDF weighting, $n_i$ can be replaced with its corresponding weight, $w_i$. The weight vector w is a vector containing the TiFDF scores for all features extracted from the user inputted text. The weight vector is preferably normalized to have unit length:

$$P(e \mid c, M) = \prod_i P(g_i \mid c, M)^{w_i}$$

And converting to logs:

$$\log(P(e \mid c, M)) = \sum_i w_i \cdot \log(P(g_i \mid c, M))$$

log(P(e|c,M)) can be rewritten as the dot product of two vectors, one representing the weights and the other representing the log probabilities:

$$\log(P(e|c,M)) = w \cdot v$$

In order to compute the above, an estimate of the image/label dependent feature likelihood, ($g_i$|c,M), is needed. The search engine 100' takes this estimate from the image/label statistical model which has been trained by analysing the frequency of features in the source text.

Under this approach, however, if the probability estimate for any feature of the user inputted text is zero (because, for example, the term is not present in the language model), the final probability P(E|c,M) would be zero. If the training corpus is sparse, it is unlikely that every feature in the user inputted text will have been observed in the training corpus for the image/label statistical model. Hence some form of smoothing can be used to reallocate some of the probability mass of observed features to unobserved features. There are many widely accepted techniques for smoothing the frequency-based probabilities, e.g. Laplace smoothing.

The search engine 100' can therefore determine which image/label 50 is the most relevant given the user inputted text by querying each image/label statistical model of the image/label database 70 with features $f_i$ extracted from the user inputted text, to determine which image/label statistical model provides the greatest probability estimate (since the image/label statistical models are mapped to corresponding images/labels).

As mentioned previously, the search engine 100' can take into account additional types of evidence, e.g. evidence that relates specifically to a given user, e.g. previously generated language, previously entered images/labels, or social context/demographic (e.g. since the type of emoji that is popularly used may vary with nationality/culture/age).

Furthermore, the search engine may take into account a prior probability of image/label relevance, e.g. a measure of the likelihood that an image/label will be relevant in the absence of any specific evidence related to an individual user or circumstance. This prior probability can be modelled using an aggregate analysis of general usage patterns across all images/labels. There are many further information sources that can be taken into account, for instance recency (how recently the image/label was inputted by a user) could be important, particularly in the case where an up-to-date image/label is particularly relevant, or if the image/label is used in a twitter feed followed by a large number of followers.

If multiple evidence sources 12', 12" are taken into account, the search engine 100' generates an estimate for each image/label given each evidence source. For each image/label, the search engine is configured to combine the estimates for the evidences sources to generate an overall estimate for that image/label. To do this, the search engine 100' may be configured to treat each of the evidence sources as independent, i.e. a user's image/label input history as independent from the text input.

To compute the probability, $P(E|c,M_c)$, of seeing the evidence, E, given a particular image/label, c, the evidence E is assumed to be separated into non-overlapping, mutually independent sets, $[e_1, \ldots, e_n]$, that are independently generated from some distribution, conditioned on a target image/label c and an associated model $M_c$. This independence assumption can be written as:

$$P(E \mid c, M_c) = \prod_i P(e_i \mid c, M_c)$$

The probability $P(E|c,M_c)$ is therefore calculated by the search engine 100' as a product of the probability estimates for the independent evidence sources $e_i$. The search engine 100' is therefore configured to calculate the individual evidence estimates separately.

There is a statistical model for each image/label, M, associated with each evidence source, and the relative impact of individual evidence sources can be controlled by the search engine 100' by a per-distribution smoothing hyper-parameter which allows the system to specify a bound on the amount of information yielded by each source. This can be interpreted as a confidence in each evidence source. An aggressive smoothing factor on an evidence source (with the limiting case being the uniform distribution, in which case the evidence source is essentially ignored) relative to other evidence sources will reduce the differences between probability estimates for an evidence source conditioned on different pieces of images/labels. The distribution becomes flatter as the smoothing increases, and the overall impact of the source on the probability, $P(E|c,M_c)$, diminishes.

As described above, in one example, the statistical model may be a language model, such that there is a plurality of language models associated with the plurality of images/labels, where those language models comprise n-gram word sequences. In such an embodiment, the language models may be used to generate word predictions on the basis of the user inputted text (e.g. by comparing the sequence of words of the user inputted text to a stored sequence of words, to predict the next word on the basis of the stored sequence). The system is therefore able to generate a word prediction via the individual language models as well as an image/label prediction via the search engine. Alternatively, the system may comprise one or more language models (e.g. word-based language model, morpheme-based language model etc.), in addition to the statistical models of the search engine, to generate text predictions.

To increase processing speed, the search engine 100' may be configured to discard all features $f_i$ which have a TFiDF value lower than a certain threshold. Features with a low TFiDF weighting will, in general, have a minimal impact on the overall probability estimates. Furthermore, low TFiDF terms ('stop words') also tend to have a reasonably uniform distribution of occurrence across content corpora, meaning their impact on the probability estimates will also be reasonably uniform across classes. By reducing the number of features the search engine 100' uses to query the image/label database 70 with, the processing speed is increased.

Alternatively, or in addition, the search engine can be configured to retrieve the top k images/labels. The top-k image/label retrieval acts as a first pass to reduce the number of candidate images/labels, which can then be ranked using a more computationally expensive procedure. For each feature of the user inputted text, f, with TFiDF t (normalised to be in the range [0,1]), the search engine is configured to find the k·t images/labels which have the highest probabilistic association with f, where this set of images/labels is denoted $C_f$. The search engine can then determine the union across all features $C=U_f<FC_f$ to obtain a set of candidate images/labels which is bounded above by |F|·k in size. The search engine than 'scores' the evidence with respect to this limited set of candidate images/labels. Since k is likely to be small compared to the original number of images/labels, this provides a significant performance improvement. Any other suitable solution for retrieving the top k images/labels can be employed, for example by using Apache Lucene (http://lucene.apache.org/) or by using a k-nearest neighbour approach (http://en.wikipedia.org/wiki/Nearest_neighbor_search # k-nearest_neighbor), etc. The value for k will depend on device capabilities versus accuracy requirements and computational complexity (for example, the number of features, etc.). The third solution to reduce the burden of image/label input uses a classifier to generate relevant image/label predictions on the basis of user entered text.

Figure 6:
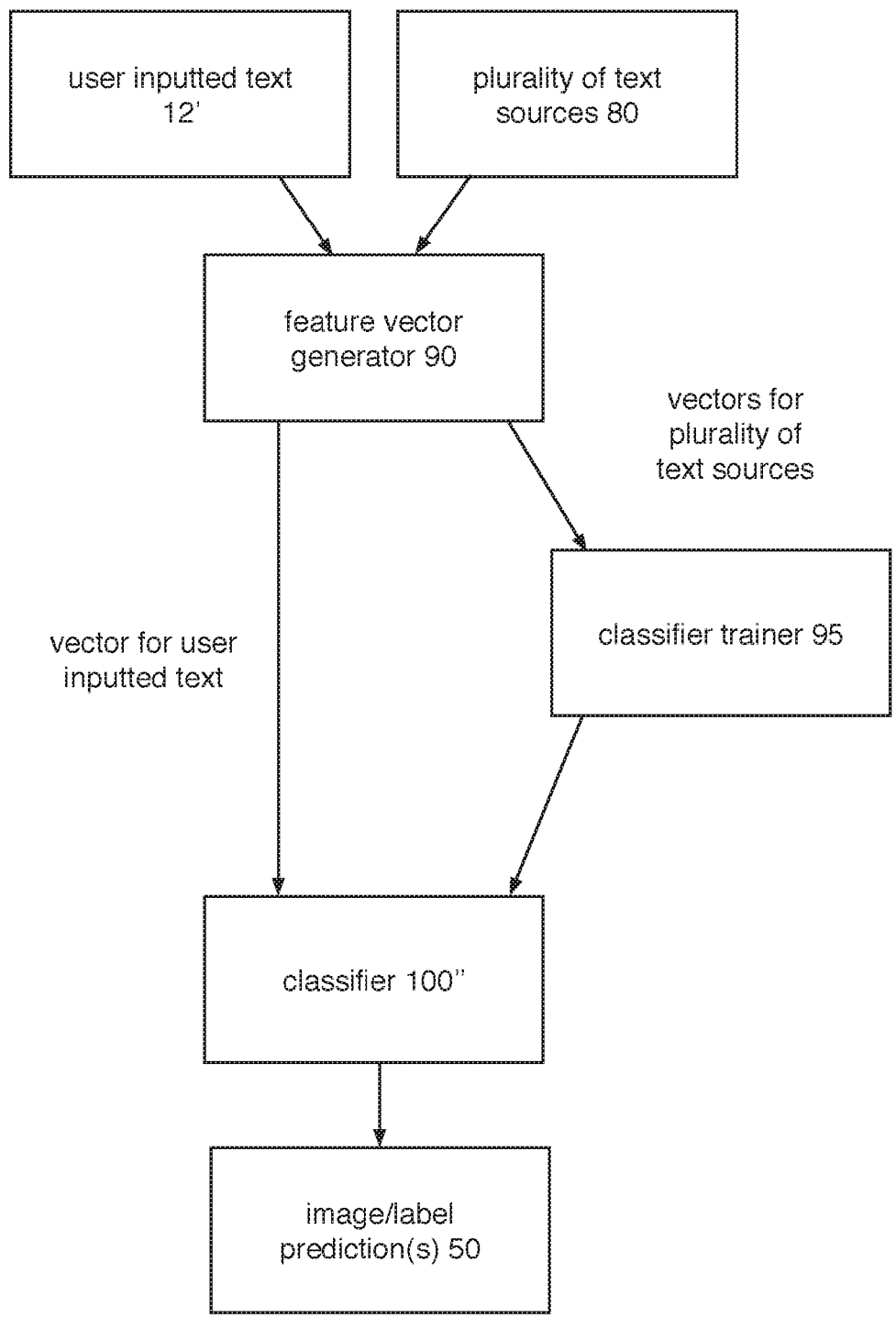
FIG. 6 shows a system for generating image/label predictions in accordance with a third system type of the present invention.

FIG. 6 illustrates a system in accordance with a third embodiment of the invention that comprises a classifier 100" to generate image/label predictions 50 that are relevant to user inputted text 12'. A classifier 100" for generating text predictions has been described in detail in WO 2011/042710, which is hereby incorporated by reference in its entirety. In machine learning and statistics, classification is the problem of identifying to which of a set of categories (sub-populations) a new observation belongs, on the basis of a training set of data containing observations (or instances) whose category membership is known. The classifier 100" is the feature that implements classification, mapping input data to a category. In the present invention, the classifier 100" is configured to map user inputted text to image/labels.

The classifier 100" is trained on text data that has been pre-labelled with images/labels, and makes real-time image/label predictions 50 for sections of text 12 entered into the system by a user.

A plurality of text sources 80 are used to train the classifier 100". Each of the plurality of text sources 80 comprises all of the sections of text associated with a particular image/label as found in the source data. For an unsupervised approach to generating the text sources, any text of a sentence comprising a particular image/label may be taken to be text associated with that image/label or any text which precedes the image/label may be taken to be associated text, for example a twitter feed and its associated hashtag or a sentence and its associated emoji.

Thus, each text source of the plurality of text sources 80 is mapped to or associated with a particular image/label.

User inputted text 12' is input into a Feature Vector Generator 90 of the system. The Feature Vector Generator 90 is configured to convert the user inputted text 12' into a feature vector ready for classification. The Feature Vector Generator 90 is as described above for the search engine system. The Feature Vector Generator 90 is also used to generate the feature vectors used to train the classifier (from the plurality of text sources) via a classifier trainer 95.

The value D of the vector space is governed by the total number of features used in the model, typically upwards of 10,000 for a real-world classification problem. The Feature Vector Generator 90 is configured to convert a discrete section of text into a vector by weighting each cell according to a value related to the frequency of occurrence of that term in the given text section, normalised by the inverse of its frequency of occurrence (TFiDF) across the entire body of text, where tf(t) is the number of times term t occurs in the current source text, and df(t) is the number of source texts in which t occurs across the whole collection of text sources. Each vector is then normalised to unit length by the Feature Vector Generator 90.

The Feature Vector Generator 90 is configured to split user inputted text 12' into features (typically individual words or short phrases) and to generate a feature vector from the features. The feature vectors are D-dimensional real-valued vectors, $R^D$, where each dimension represents a particular feature used to represent the text. The feature vector is passed to the classifier 100" (which uses the feature vector to generate image/label predictions).

The classifier 100" is trained by a training module 95 using the feature vectors generated by the Feature Vector Generator 90 from the text sources 80. A trained classifier 100" takes as input a feature vector that has been generated from text input by a user 12', and yields image/label predictions 50, comprising a set of image/label predictions mapped to probability values, as an output. The image/label predictions 50 are drawn from the space of image/label predictions associated with/mapped to the plurality of text sources.

In a preferred embodiment, the classifier 100' is a linear classifier (which makes a classification decision based on the value of a linear combination of the features) or a classifier based on the batch perceptron principle where, during training, a weights vector is updated in the direction of all misclassified instances simultaneously, although any suitable classifier may be utilised. In one embodiment, a timed aggregate perceptron (TAP) classifier is used. The TAP classifier is natively a binary (2-class) classification model. To handle multi-class problems, i.e. multiple images/labels, a one-versus-all scheme is utilised, in which the TAP classifier is trained for each image/label against all other images/labels. The training of a classifier is described in more detail on line 26 of page 10 to line 8 of page 12 in WO 2011/042710, which is hereby incorporated by reference.

A classifier training module 95 carries out the training process as already mentioned. The training module 95 yields a weights vector for each class, i.e. a weights vector for each image/label.

Given a set of N sample vectors of dimensionality D, paired with target labels $(x_i, y_i)$ the classifier training procedure returns an optimized weights vector, $\hat{w} \in R^D$. The prediction, f(x), of whether an image/label is relevant for a new user inputted text sample, $x \in R^D$, can be determined by:

$$f(x) = \text{sign}(\hat{w} \cdot x) \quad (1)$$

Where the sign function converts an arbitrary real number to +/−1 based on its sign. The default decision boundary lies along the unbiased hyperplane $\hat{w} \cdot x = 0$, although a threshold can be introduced to adjust the bias.

A modified form of the classification expression (1) is used without the sign function to yield a confidence value for each image/label, resulting in an M-dimensional vector of confidence values, where M is the number of images/labels. So, for instance, given a new, unseen user inputted text section represented by vector sample $x \in R^D$ the following confidence vector $c \in R^D$ would be generated (where M=3 for simplicity):

$$c = \begin{pmatrix} \hat{w}_1 \cdot x \\ \hat{w}_2 \cdot x \\ \hat{w}_3 \cdot x \end{pmatrix}$$

Assuming a flat probability over all images/labels, the image/label confidence values generated by the classifier 100" are used to generate a set of image/label predictions (where the dot product with the highest value (greatest confidence) is matched to the most likely image/label).

If the images/labels are provided with a prior probability, e.g. a measure of the likelihood that an image/label will be relevant in the absence of any specific evidence related to an individual user or circumstance, or a prior probability based on the user's image/label input history, etc., then the system may further comprises a weighting module. The weighting module (not shown) may use the vector of confidence values generated by the classifier to weight the prior probabilities for each image/label to provide a weighted set of image/label predictions 50.

The weighting module may be configured to respect the absolute probabilities assigned to a set of image/label predictions, so as not to skew spuriously future comparisons. Thus, the weighting module can be configured to leave image/label predictions from the most likely prediction component unchanged, and down-scales the probability from less likely images/labels proportionally.

The image/label predictions 100" output by the classifier 100" (or weighting module) can be displayed on a user interface for user selection.

As will be understood from above, the classifier 100" is required to generate the dot product of the input vector with each image/label vector to generate image/label predictions 50. Thus, the greater the number of image/labels, the greater the number of dot products the classifier is required to calculate.

To reduce the number of classes, the images/labels may be grouped together, e.g. all emojis relating to a particular emotion (such as happiness) can be grouped into one class, or all emojis relating to a particular topic or subject, such as clothing etc. In that instance, the classifier would predict the class, for example an emotion (sad, happy, etc.) and the n most likely emoji predictions of that class can be displayed to the user for user selection. However, this does result in the user having to select from a larger panel of emojis. To reduce processing power, whilst still predicting the most relevant emoji, the coarser grade classes could be used to find the right category of emoji, with the finer emoji prediction occurring only for that coarser category, thus reducing the number of dot products the classifier is required to take.

Alternatively, a first set of features can be extracted from the user inputted text to generate an initial set of image/label predictions, and a second set of features can be extracted from the user inputted text to determine the one or more most-likely image/label predictions from that initial set of image/label predictions. To save on processing power, the first set of features may be smaller in number than the second set of features.

If the system is to deal with a large volume of images/labels then the use of a search engine 100' may become more desirable than the classifier 100'', because the search engine calculates the probabilities associated with the images/labels by a different mechanism which is able to cope better with determining probability estimates for a large volume of images/labels.

The systems of the present invention can be employed in a broad range of electronic devices. By way of non-limiting example, the present system can be used for messaging, texting, emailing, tweeting etc. on mobile phones, PDA devices, tablets, or computers.

The present invention is also directed to a user interface for an electronic device, wherein the user interface displays the predicted image/label 50 for user selection and input. The image/label prediction 50 can be generated by any of the systems discussed above. As described in more detail below, the user interface preferably displays one or more word/term predictions 60 for user selection, in addition to the display of one or more image/label predictions 50.

A user interface in accordance with embodiments of the invention will now be described with reference to FIGS. 7-11. FIGS. 7-11 illustrate, by way of example only, the display of an emoji on a user interface for user selection and input. However, the invention is not limited to the display and input of an emoji, and is applicable to any image/label prediction 50.

Figure 7:
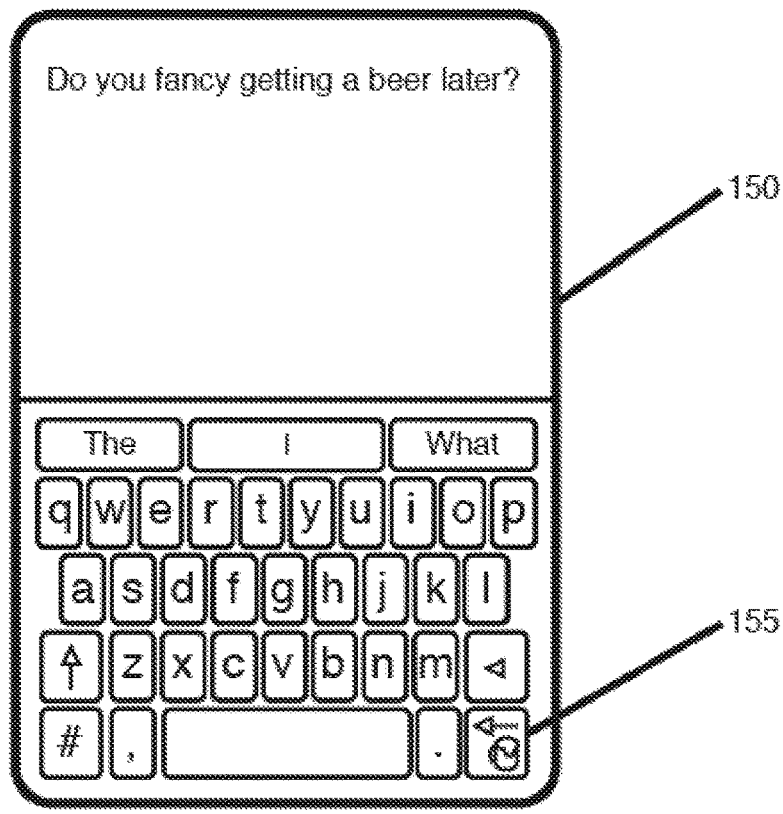
FIGS. 7-11 illustrate different embodiments of a user interface in accordance with the present invention.

In a first embodiment of a user interface, as illustrated in FIG. 7, the user interface comprises one or more candidate prediction buttons (in this example, three candidate prediction buttons) displaying one or more (in this example three) most likely user text predictions (i.e. 'The', 'I', 'What', in this example). The user interface 150 also comprises a virtual button 155 for displaying the current most relevant image/label prediction 60 (in a preferred embodiment, an emoji, and in the particular example illustrated a beer emoji). Processing circuitry of the device is configured such that a first user input, for example a tap on a touchscreen device, directed at the virtual button 155 displaying the emoji, inputs the displayed emoji into the device; and a second user input (different from the first user input), for example a long-press or directional swipe directed at the button 155, opens a menu to other actions, e.g. next most relevant emoji predictions, all emoji, carriage return, etc.

Figure 8:
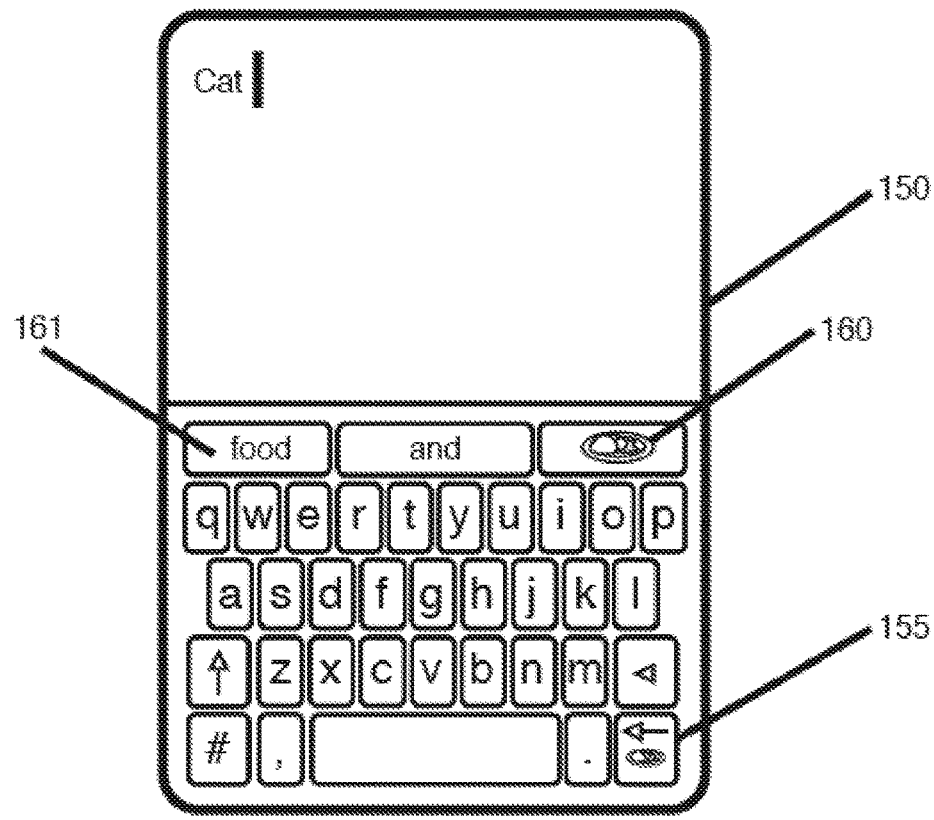

In a second embodiment of a user interface 150 illustrated in FIG. 8, an image (e.g. emoji) prediction 50 mapped to a word prediction 60 (e.g. through the word->emoji correspondence map of FIG. 2a) will be presented as a prediction 160 on a prediction pane, alongside the matching word prediction 161. The candidate prediction buttons therefore display the two most relevant word predictions (for the example of a user interface with three candidate buttons) and the image (e.g. emoji) most appropriate for the most relevant word prediction. Alternatively, the image/label prediction presented as a prediction 160 on the prediction pane is the most-likely image/label prediction (as determined by any of the above described systems) and does not therefore need to correspond to a word prediction of the prediction pane. For consistency of layout, the image (e.g. emoji) prediction 160 may always be displayed on the right-hand side of the prediction pane, making the image easy to locate. Alternative image (e.g. emoji) predictions 60 may be made available by long-pressing the image (e.g. emoji) prediction button 160. The emoji button 155 reflects this prediction and also presents emoji related to recently typed words. A first gesture (e.g. a tap) on the image (for the illustrated example, emoji) button 155 will insert the emoji displayed by the button, and a second gesture on the button (e.g. a longpress or swipe) will display the emojis related to recently typed words for user selection.

Figure 9:
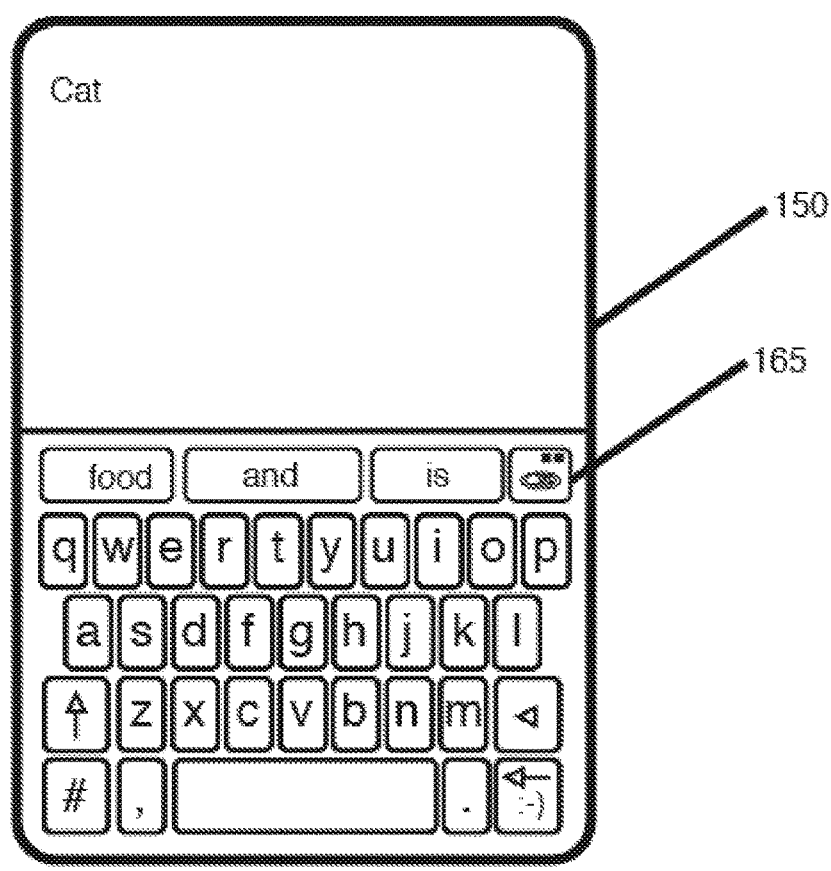

In a third embodiment of a user interface 150 illustrated in FIG. 9, an image/label (e.g. for the illustrated example, an emoji) candidate prediction button 165 which displays the current most likely image (e.g. emoji) permanently appears on the prediction pane. When there are emoji associated with either the current word candidates (in this example 'food', 'and', 'is') or words that have been recently typed (e.g. 'cat'), one is presented on this candidate button 165. The emoji displayed on the button 165 can be inserted via a first gesture on the button 165 or button 155 (e.g. a tap), with the alternative emojis available via a second gesture on the button 155 or button 165 (e.g. by a long-press or swipe).

In a preferred embodiment, the image/label panel (e.g. emoji panel) displaying alternative relevant images (e.g. emojis) can be accessed by long-pressing the imagel/label candidate prediction button 165. To access all emoji (rather than just those offered as the most likely emoji), the user long presses the emoji candidate prediction button 165, slides their finger towards the emoji panel icon and releases. The emoji panel icon will be on the far left side of the pop-up to allow a 'blind directional swipe' to access it. The rest of the pop-up is filled with extended emoji predictions.

Figure 10:
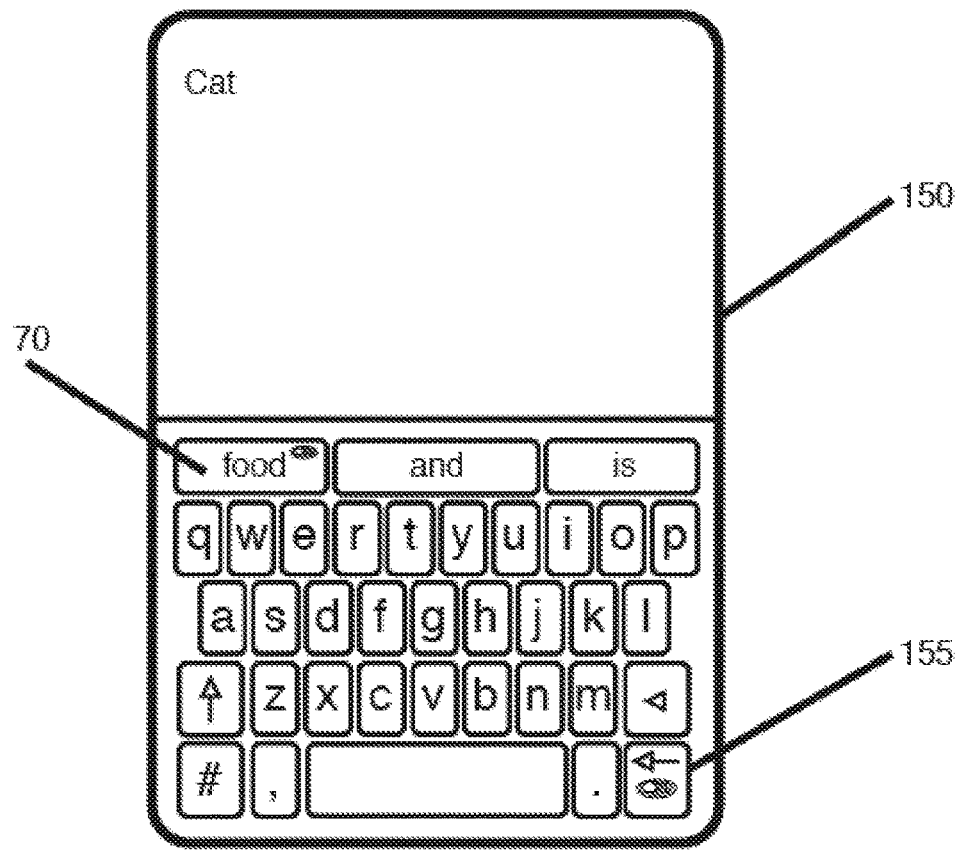

In an alternative user interface, as illustrated in FIG. 10, the image/label (e.g. emoji) can be displayed with its matching word on a candidate button 170 of the prediction pane. The word can be inserted by a first user gesture on the candidate button 170 (e.g. by tapping the button 170), with the image/label (e.g. emoji) inserted via a second user gesture on the candidate button 170 (for example, by a long press of the button 170). Furthermore, if desired, a standard emoji key 155 can be provided as with previous user interface embodiments to allow the user to insert a predicted emoji (which may not necessarily match the predicted word) or allow the user to search for alternative emojis.

Figure 11:
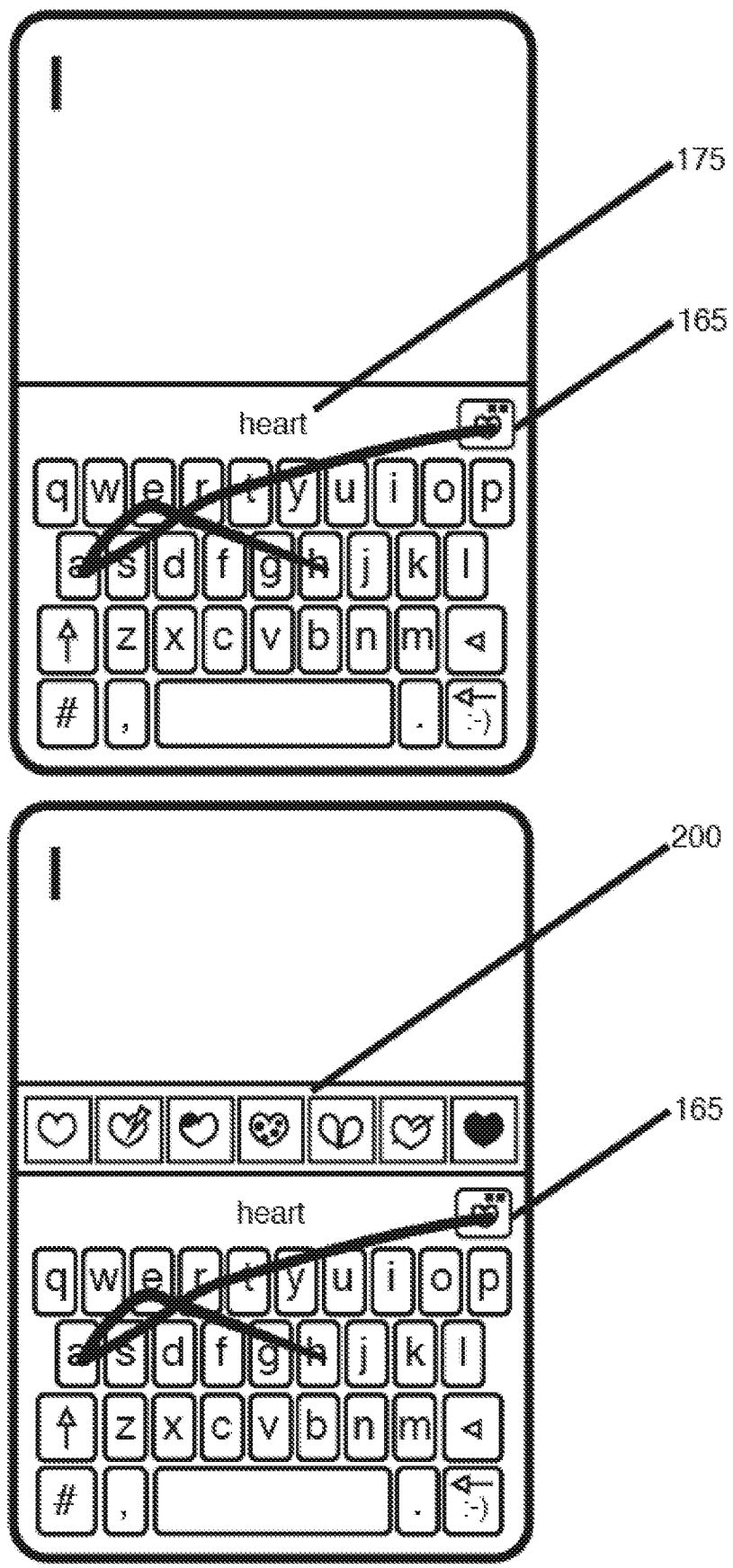

FIG. 11 illustrates how an image (e.g. emoji) can be displayed and inserted with a continuous touch input, for example as described in detail in earlier application WO2013/107998, which is hereby incorporated by reference in its entirety, and as illustrated in FIG. 1 of WO2013/107998. In the user interface of FIG. 11, the prediction pane comprises a word prediction button 175 'heart' and an emoji prediction button 165 which displays a relevant emoji, e.g. [heart emoji]. To insert the text prediction 'heart' the user moves over to the word prediction pane and removes their finger from contact with the user interface at a location on the word prediction button 175. Alternatively, the word prediction is inserted whenever the user lifts their finger form the user interface, unless their finger is lifted at the emoji button. For example, the processing circuitry can be configured to insert the word if the user lifts their finger from the user interface whilst on the last character of the word or even mid-word when the prediction engine has predicted and displayed that word for user selection and input. To insert the predicted emoji, the user breaks contact with the touchscreen interface at the emoji candidate button 165. Furthermore, the processing circuitry for the user interface may be configured such that the user ending the continuous touch gesture on the emoji button 165 and remaining on the emoji button 165 for a particular length of time brings up a pop-up panel 200 of alternative emojis for user selection.

The user interface has been described as comprising various 'buttons'. The term 'button' is used to describe an area on a user interface where an image/label/word is displayed, where that image/label/word which is displayed can be input by a user by activating the 'button', e.g. by gesturing on or over the area which displays the image/label/word.

By the described user interface, the user is able to insert relevant images/labels (including emojis) with minimal effort.

Methods of the present invention will now be described with reference to FIGS. 12-16 which are schematic flow charts of methods according to the invention.

Figure 12:
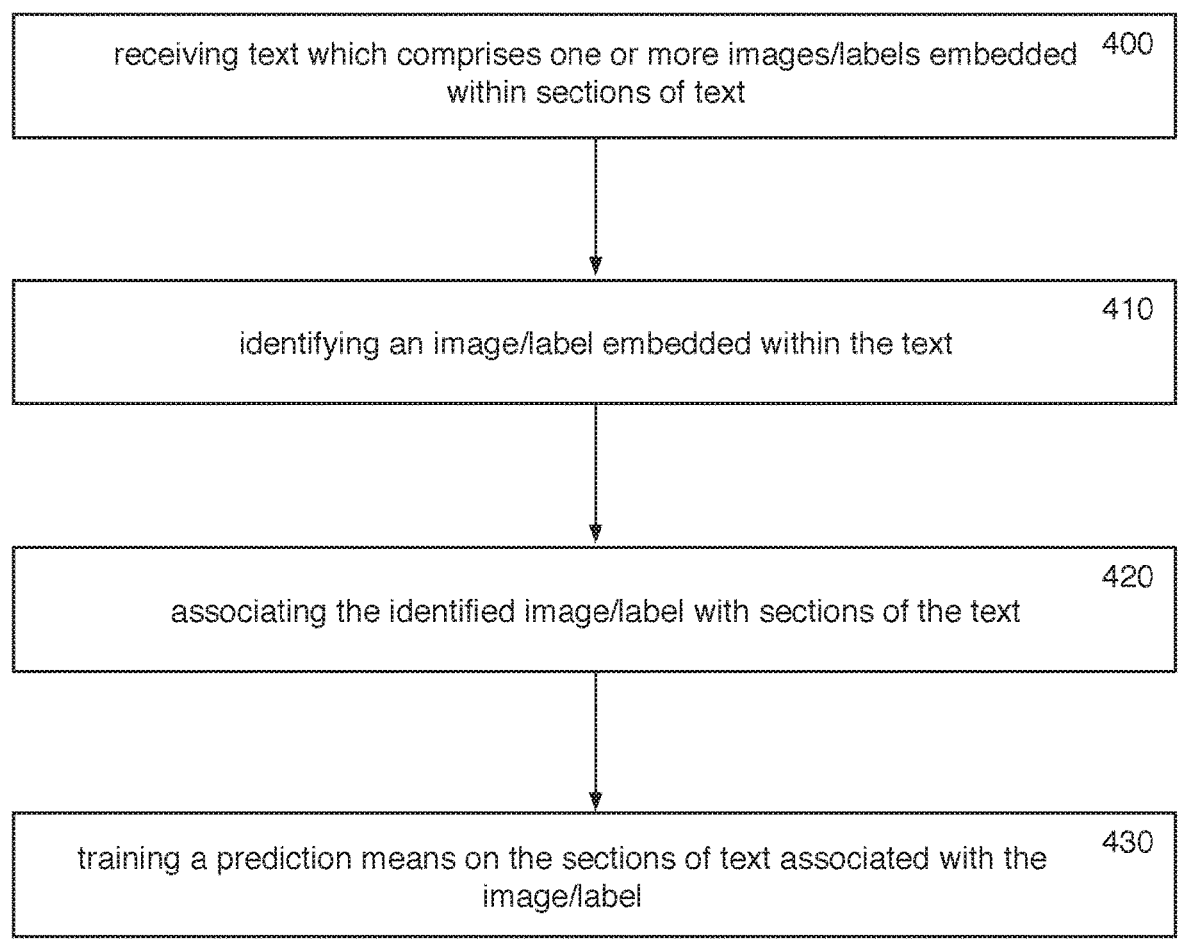
FIGS. 12-16 show flow charts according to methods of the present invention.

Referring to FIG. 12, the present invention provides a method of generating a prediction means to predict an image/label relevant to user inputted text. As discussed above in relation to the various systems of the present invention, the method comprises receiving text having one or more images/labels embedded within sections of text 400, identifying an image/label embedded within the text 410, and associating the identified image/label with sections of the text 420. The prediction means is then trained on the sections of text associated with the image/label. As described above, when the prediction means is a language model 10, the language model 10 is trained on text comprising images/labels, for example by including an image/label in an n-gram word/image sequence or by appending the image/label to an n-gram word sequence. When the prediction means is a search engine 100' comprising a plurality of statistical models, each statistical model can be mapped to a given image/label and trained on text associated with that image/label. When the prediction means is a classifier 100" trained on a plurality of text sources, each text source comprises sections of text associated with a given image/label.

Figure 13:
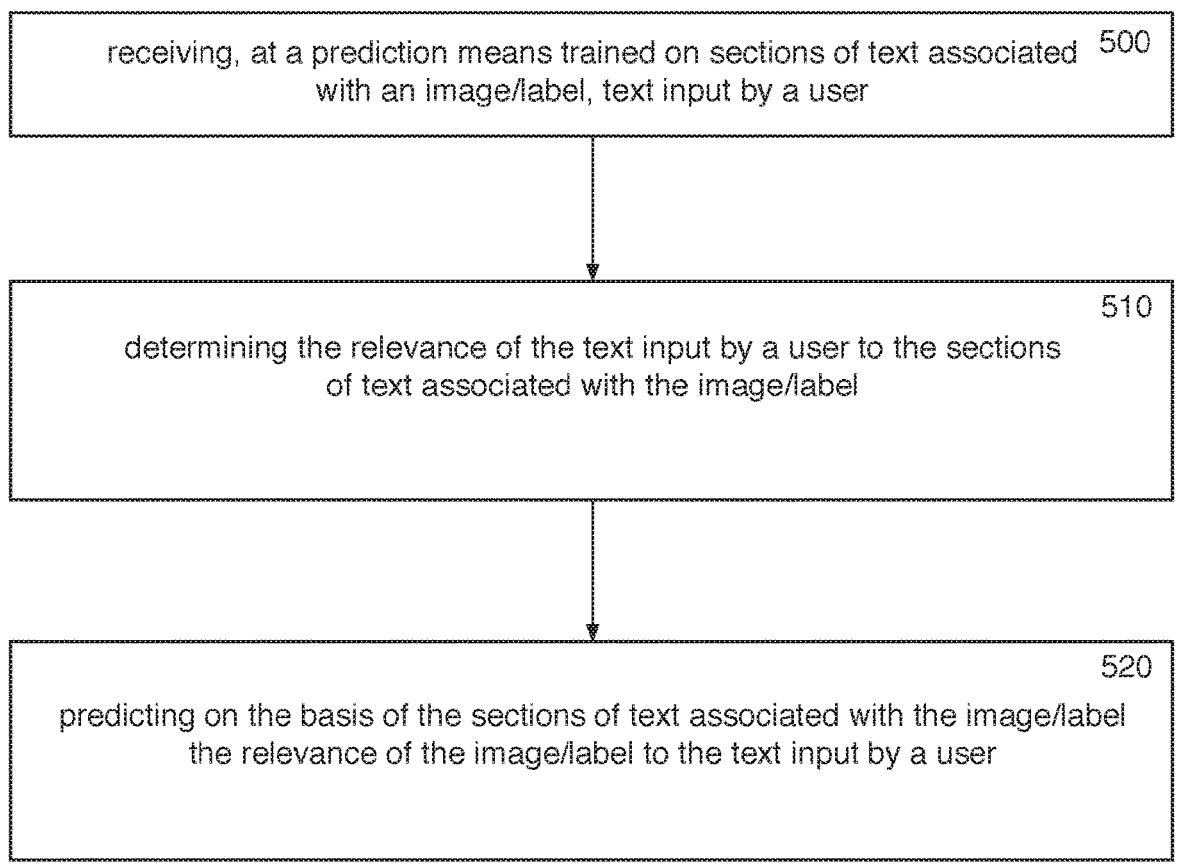

In a second method of the invention, as illustrated in FIG. 13, there is provided a method of predicting using a prediction means an image/label relevant to text input into a system by a user, wherein the prediction means is trained on sections of text associated with an image/label. The method comprises receiving at the prediction means the text input by a user 500, determining the relevance of the text input by a user to the sections of text associated with the image/label 510, and predicting on the basis of the sections of text associated with the image/label the relevance of the image/label to the text input by a user 520. As described above in relation to the system description, when the prediction means is the search engine 100', the search engine 100' determines the relevance of the user inputted text by extracting features from the user inputted text and querying an image/label database 70 with those features. By querying the database 70, the search engine 100' is able to determine which image/label statistical model is the most relevant and is therefore able to generate image/label predictions 50, because each statistical model is mapped to a particular image/label. Again, as described above with respect to the system, when the prediction means is a classifier 100", the classifier 100' is able to determine the relevance of an image/label to user inputted text by generating the dot product of a feature vector representing the image/label (generated from the source text which comprises sections of text associated with that image/label) with a feature vector representing the user inputted text.

Figure 14:
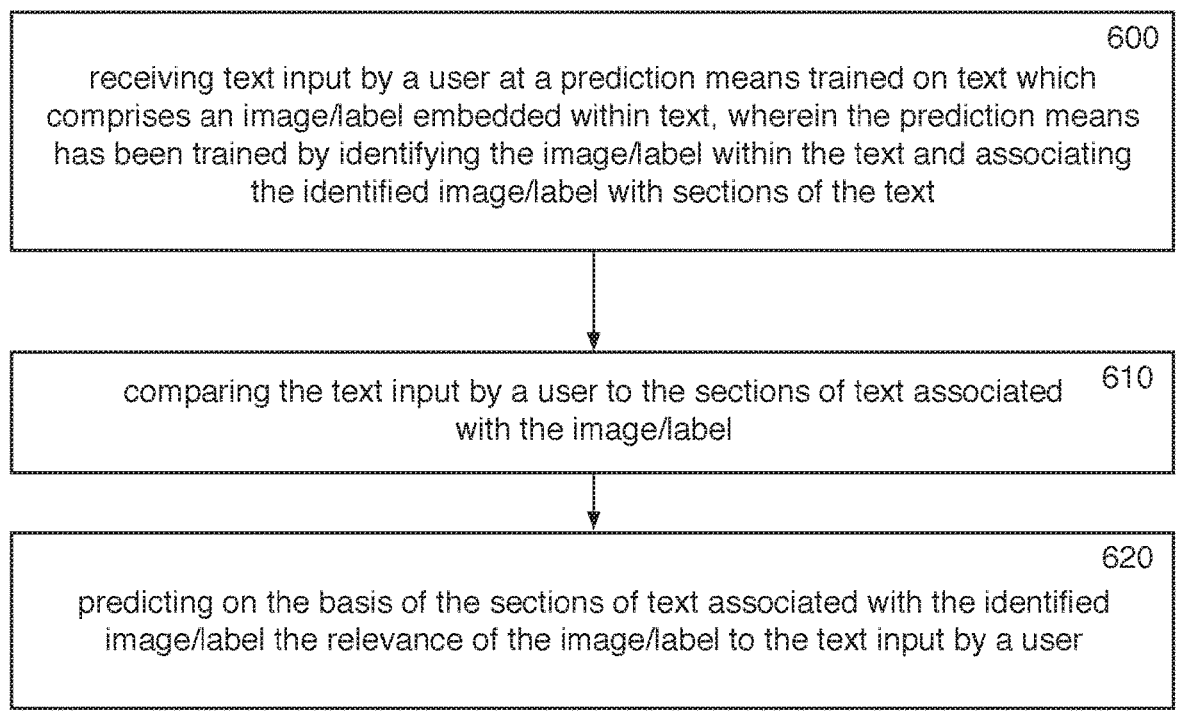
Figure 15:
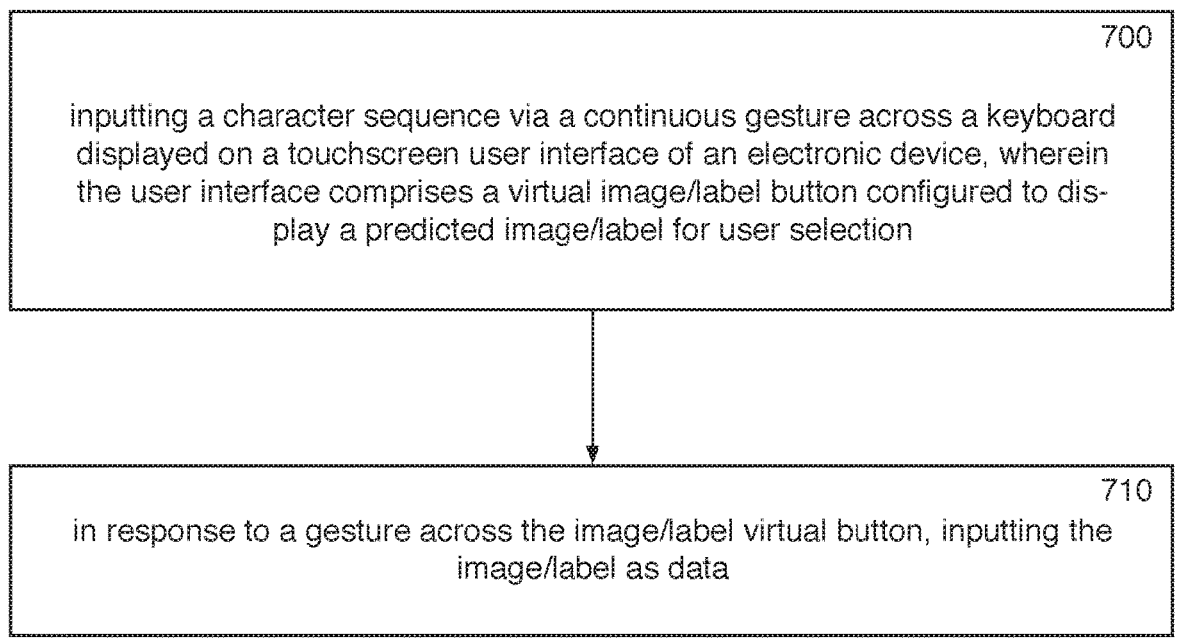
Figure 16:
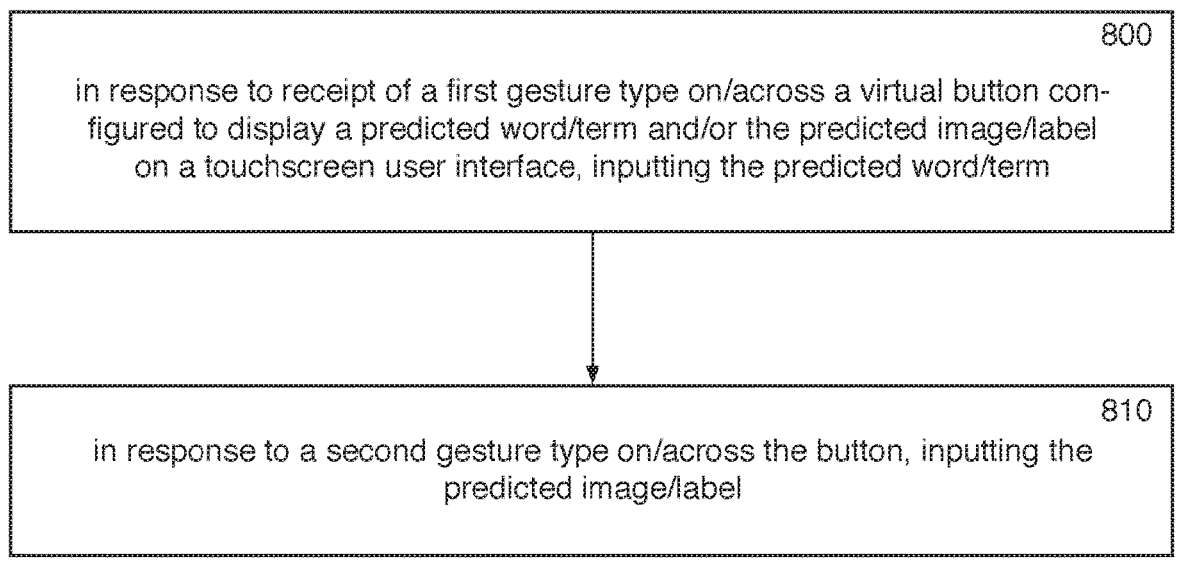

In a third method of the invention, as illustrated in FIG. 14, there is provided a method to predict using a prediction means an image/label relevant to text input into a system by a user, wherein the prediction means is trained on text which comprises an image/label embedded within text, wherein the prediction means has been trained by identifying the image/label within the text and associating the identified image/label with sections of the text. The method comprises receiving at the prediction means the text input by a user 600, comparing the text input by a user to the sections of text associated with the image/label 610, and predicting on the basis of the sections of text associated with the identified image/label the relevance of the image/label to the text input by a user 620. As described above in relation to the system description, when the prediction means is a language model 10, the language model may comprise an image/label within an n-gram word/image sequence of an n-gram map 14' or an image/label appended to an n-gram word sequence of an n-gram map 14'. The language model predicts a relevant image/label 50 by comparing the user inputted text to a stored n-gram sequence and outputting a relevant image/label which is part of the stored n-gram or is appended to the stored n-gram. Alternatively, the language model comprises a word-based n-gram map 14 and a word→image correspondence map 40 which is trained on sections of text (i.e. words) associated with the images. The language model is configured to predict the next word in a sequence of user inputted words by comparing the word sequence to a stored n-gram of the map 14 and then mapping this predicted word to an image using the correspondence map 40.

Third and fourth methods of the invention relate to a user's interaction with a touchscreen user interface of a device comprising one or more of the above described systems for generating image/label predictions 50. In particular, the third method of the invention provides a method of entering data into an electronic device comprising a touchscreen user interface having a keyboard, wherein the user interface comprises a virtual image/label button configured to display the predicted image/label for user selection. The method comprises inputting a character sequence via a continuous gesture across the keyboard 700. In response to a user gesture across the image/label virtual button, the method comprises inputting the image/label as data 720. The gesture may include breaking contact with the user interface at the image/label virtual button.

The fourth method relates to a method for selecting between entry of a word/term and entry of an image/label that corresponds to that word/term on a touchscreen user interface comprising a virtual button configured to display a predicted word/term and/or the predicted image/label. The method comprises, in response to receipt of a first gesture type on/across the button, inputting the predicted word/term 800; and, in response to a second gesture type on/across the button, inputting the predicted image/label 810.

As will be apparent from the above description, the present invention solves the above mentioned problems by providing a system and method for predicting emojis/stickers based on user entered text. The present invention is able to increase the speed of emoji input by offering one or several relevant emoji predictions, which saves the user from having to scroll through different emojis to identify the one they want.

Furthermore, the system and method of the present invention provides increased emoji discoverability, as the prediction of emojis based on next-word prediction/correction and context means that an emoji may be predicted and presented to a user, even though the user may not be aware that a relevant or appropriate emoji exists.

The systems and methods of the present invention therefore provide efficient emoji selection and input into an electronic device. Rather than having to scroll through possible emojis, the user can insert a relevant emoji by the tap of a virtual key displaying a predicted emoji.

Although the examples have been provided with reference to emojis, the invention is equally applicable to the insertion of any image/label relevant to user entered text, as previously described.

The present invention also provides a computer program product comprising a computer readable medium having stored thereon computer program means for causing a processor to carry out one or more of the methods according to the present invention.

The computer program product may be a data carrier having stored thereon computer program means for causing a processor external to the data carrier, i.e. a processor of an electronic device, to carry out the method according to the present invention. The computer program product may also be available for download, for example from a data carrier or from a supplier over the internet or other available network, e.g. downloaded as an app onto a mobile device (such as a mobile phone) or downloaded onto a computer, the mobile device or computer comprising a processor for executing the computer program means once downloaded.

It will be appreciated that this description is by way of example only; alterations and modifications may be made to the described embodiment without departing from the scope of the invention as defined in the claims.

The invention claimed is:

1. A computing device comprising a processor and memory, the memory storing thereon instructions that, when executed by the processor, cause the computing device to perform operations comprising:
receive text input from a user interface;
identify a set of images or labels for the received text input using a prediction function, wherein the prediction function implements a language model trained on training text, the training text comprising a plurality of images or labels embedded within the training text, wherein the language model has been trained to identify the images or labels within the training text and associate the identified images or labels with multiple sections of the training text;
assign a weight value to each respective image or label in the identified images or labels using the prediction function, wherein the weight value for a respective image or label is assigned based on predicted usage of the respective image or label among different sections of the received text input, as predicted with the language model; and
output at least one image or label of the identified images or labels in the user interface, wherein the at least one image or label is selected for output in the user interface based on the weight value assigned to the at least one image or label.

2. The computing device of claim 1, wherein the identified of images or labels are associated with sections of the training text which are located before the identified set of images or labels but do not immediately precede the identified images or labels.

3. The computing device of claim 1, wherein the received text input does not correspond to a description of the identified images or labels.

4. The computing device of claim 1, wherein the language model comprises an n-gram map comprising word sequences associated with an image or label.

5. The computing device of claim 4, further comprising instructions that, when executed by the processor, cause the computing device to perform operations comprising generate from the text input a sequence of one or more words;
wherein the prediction function is configured to:
receive the sequence of one or more words;
compare the sequence of one or more words to a stored sequence of one or more words associated with an image or label; and
predict, based on a stored sequence of one or more words associated with an image or label, an image or label relevant for the sequence of one or more words.

6. The computing device of claim 5, wherein the prediction function is further configured to predict based on the stored sequence of one or more words associated with an image or label, the next word in the sequence of one or more words.

7. The computing device of claim 1, wherein the prediction function comprises a word-based language model comprising stored sequences of words, a map which maps images to words, the map being trained on words associated with images or labels, and wherein the prediction function is further configured to:
generate from the text input a sequence of one or more words;
compare the sequence of one or more words to a stored sequence of words to predict the next word in the sequence of one or more words; and
predict using the map an image that is associated with the next word.

8. The computing device of claim 1, wherein the prediction function further comprises:
a word-based language model comprising stored sequences of words;
wherein the prediction function is configured to:
generate a sequence of one or more words from the text input;
compare the sequence of one or more words to a stored sequence of words in the word-based language model; and
predict based on a stored sequence of words the next word in the sequence.

9. The computing device of claim 1, wherein the identified images or labels includes an image, and wherein the image is an emoji, emoticon or sticker.

10. The computing device of claim 1, wherein the identified images or labels includes a label, and wherein the label is a hashtag.

11. The computing device of claim 1, further comprising the user interface configured to receive the text input and display the at least one image or label.

12. The computing device of claim 11, wherein the user interface is configured to display a predicted word or term for user selection.

13. A method of training a model for predicting a relevance of an image or label to text data, the method comprising:
receiving, by a computing device, data indicative of training text which comprises a plurality of images or labels embedded within the training text;
identifying, by the computing device, images or labels embedded within the text;
associating, by the computing device, the identified images or labels with multiple sections of the text;
assigning a weight value to a respective image or label of the identified images or labels based on a history of use of the respective image or label among the multiple sections of the text, wherein the weight value is relative to the history of use of the respective image or label; and
training, by the computing device, a prediction function executing on the computing device, wherein the prediction function implements a language model that is trained from the training text, and wherein the training causes the language model to predict the images or labels within the training text and associate the identified images or labels among the multiple sections of the text, according to the assigned weight value associated with the respective image or label.

14. A method performed by a computing device, the method comprising:

receiving, by a user interface of the computing device, text input;

identifying a set of images or labels for the received text input using a prediction function, wherein the prediction function implements a language model trained on training text, the training text comprising a plurality of images or labels embedded within the training text, wherein the language model has been trained to identify the images or labels within the training text and associate the identified images or labels with multiple sections of the training text;

assigning a weight value to each respective image or label in the identified images or labels using the prediction function, wherein the weight value for a respective image or label is assigned based on predicted usage of the respective image or label among different sections of the received text input, as predicted with the language model; and outputting at least one image or label of the identified images or labels in the user interface, wherein the at least one image or label is selected for output in the user interface based on the respective weight value assigned to the at least one image or label.

15. The method of claim 14, wherein the prediction function further comprises a search engine comprising a plurality of statistical models corresponding to a plurality of images or labels, wherein the method comprises training each of the plurality of statistical models on sections of text associated with a corresponding image or label for that statistical model.

16. The method of claim 14, wherein the prediction function further comprises a classifier, the method further comprising training the classifier on a plurality of text sources, the text sources comprising sections of text associated with a particular image or label.

17. The method of claim 16, further comprising extracting, using a feature generation mechanism, a set of features from the text input.

18. The method of claim 17, further comprising generating, using the feature generation mechanism, a feature vector from the features, the feature vector representing the text input.

19. The method of claim 18, further comprising determining the term frequency-inverse document frequency for each feature and weighting the features of the feature vector with the determined values.

20. The method of claim 18, further comprising extracting using the feature generation mechanism features from each of the plurality of text sources and generating a feature vector for each image or label.

\* \* \* \* \*